US009907354B2

(12) United States Patent
Dyer

(10) Patent No.: US 9,907,354 B2
(45) Date of Patent: Mar. 6, 2018

(54) ARTICLE OF FOOTWEAR WITH SOLE STRUCTURE HAVING INTERCONNECTED FLUID-FILLED CHAMBERS

(71) Applicant: NIKE, Inc., Beaverton, OR (US)

(72) Inventor: Caleb W. Dyer, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/087,290

(22) Filed: Mar. 31, 2016

(65) Prior Publication Data

US 2016/0295958 A1 Oct. 13, 2016

Related U.S. Application Data

(60) Provisional application No. 62/144,658, filed on Apr. 8, 2015, provisional application No. 62/144,683, filed on Apr. 8, 2015.

(51) Int. Cl.
| | |
|---|---|
| *A43B 13/20* | (2006.01) |
| *A43B 13/04* | (2006.01) |
| *A43B 5/02* | (2006.01) |
| *A43B 13/02* | (2006.01) |
| *A43B 13/14* | (2006.01) |
| *A43B 13/18* | (2006.01) |
| *B29D 35/14* | (2010.01) |

(52) U.S. Cl.
CPC ............... *A43B 13/04* (2013.01); *A43B 5/02* (2013.01); *A43B 13/02* (2013.01); *A43B 13/14* (2013.01); *A43B 13/184* (2013.01); *A43B 13/206* (2013.01); *B29D 35/142* (2013.01)

(58) Field of Classification Search
CPC ...... A43B 13/20; A43B 13/203; A43B 13/206
USPC ..................................... 36/29, 35 B
See application file for complete search history.

(56) References Cited

U.S. PATENT DOCUMENTS

| | | | | | |
|---|---|---|---|---|---|
| 5,701,687 | A | * | 12/1997 | Schmidt | ................. A43B 13/20 36/29 |
| 6,041,522 | A | * | 3/2000 | Anteby | ................. A43B 13/20 36/103 |
| 6,754,981 | B1 | * | 6/2004 | Edwards | ................. A43B 7/144 36/29 |
| 2004/0244223 | A1 | * | 12/2004 | Watkins | ............... A43B 13/189 36/29 |
| 2006/0016101 | A1 | * | 1/2006 | Ungari | ................. A43C 15/168 36/61 |
| 2011/0047830 | A1 | * | 3/2011 | Francello | ............ A43B 13/203 36/134 |

* cited by examiner

*Primary Examiner* — Ted Kavanaugh
(74) *Attorney, Agent, or Firm* — Honigman Miller Schwartz and Cohn LLP; Matthew H. Szalach; Jonathan P. O'Brien

(57) ABSTRACT

An article of footwear has a sole structure with interconnected compliant components. The sole structure includes a sole plate, inner sole structure and lasting board. The inner sole structure is placed in between the sole plate and lasting board. The inner sole structure provides compliant components that protrude through the sole plate towards a ground surface. The compliant components are interconnected by channels.

20 Claims, 16 Drawing Sheets

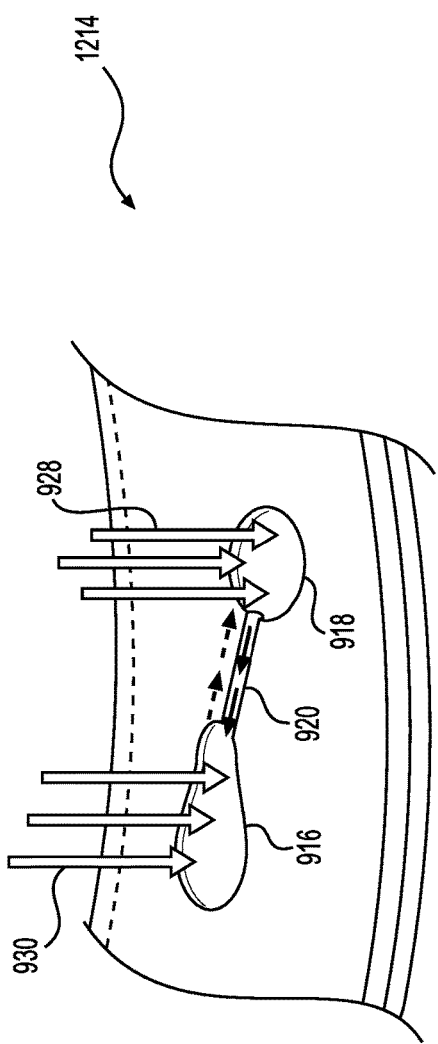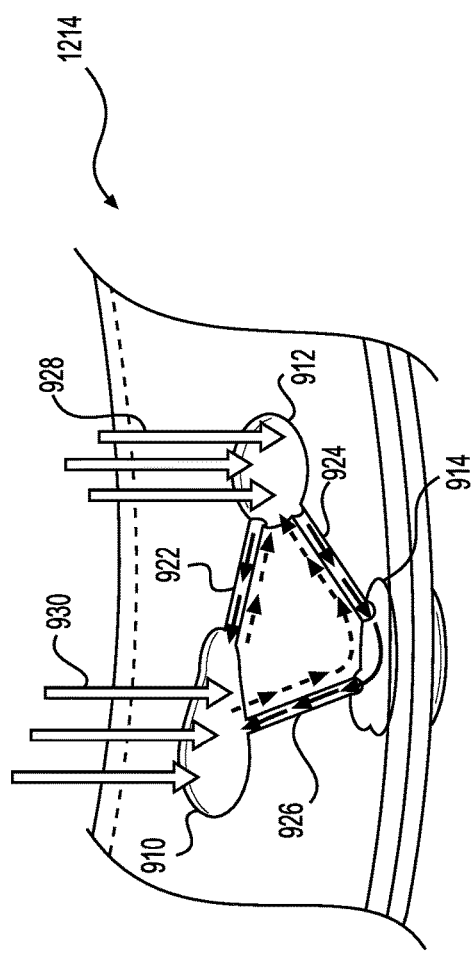

ARTICLE OF FOOTWEAR WITH SOLE STRUCTURE HAVING INTERCONNECTED FLUID-FILLED CHAMBERS

RELATED APPLICATION

This application claims the benefit of U.S. Provisional Patent Application Ser. No. 62/144,658, filed Apr. 8, 2015, and of U.S. Provisional Patent Application Ser. No. 62/144,683, filed Apr. 8, 2015, the entire contents of which are hereby incorporated by reference.

TECHNICAL FIELD

The present embodiments relate generally to articles of footwear, and in particular to articles of footwear with sole structures.

BACKGROUND

Articles of footwear generally include two primary elements: an upper and a sole structure. The upper may be formed from a variety of materials that are stitched or adhesively bonded together to form a void within the footwear for comfortably and securely receiving a foot. The sole structure is secured to a lower portion of the upper and is generally positioned between the foot and the ground. In many articles of footwear, including athletic footwear styles, the sole structure often incorporates an insole, a midsole, and an outsole.

An article of footwear may be used on many alternative types of ground surfaces. An article of footwear having at least one ground surface traction element or stud may be used to provide better traction on certain types of ground surfaces. Use of an article of footwear in some types of ground surfaces, e.g., mud or slush, may result in accumulation of compacted ground surface material on the lower surface of the article of footwear. Accumulation of ground surface material on the lower surface of an article of footwear may reduce traction of the article of footwear and/or adversely affect performance characteristics of the article of footwear and the user.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 12 is a perspective view of the fluid communication between two fluid-filled chambers;

FIG. 13 a perspective view of the fluid communication between three fluid-filled chambers;

DETAILED DESCRIPTION

Figure 1:
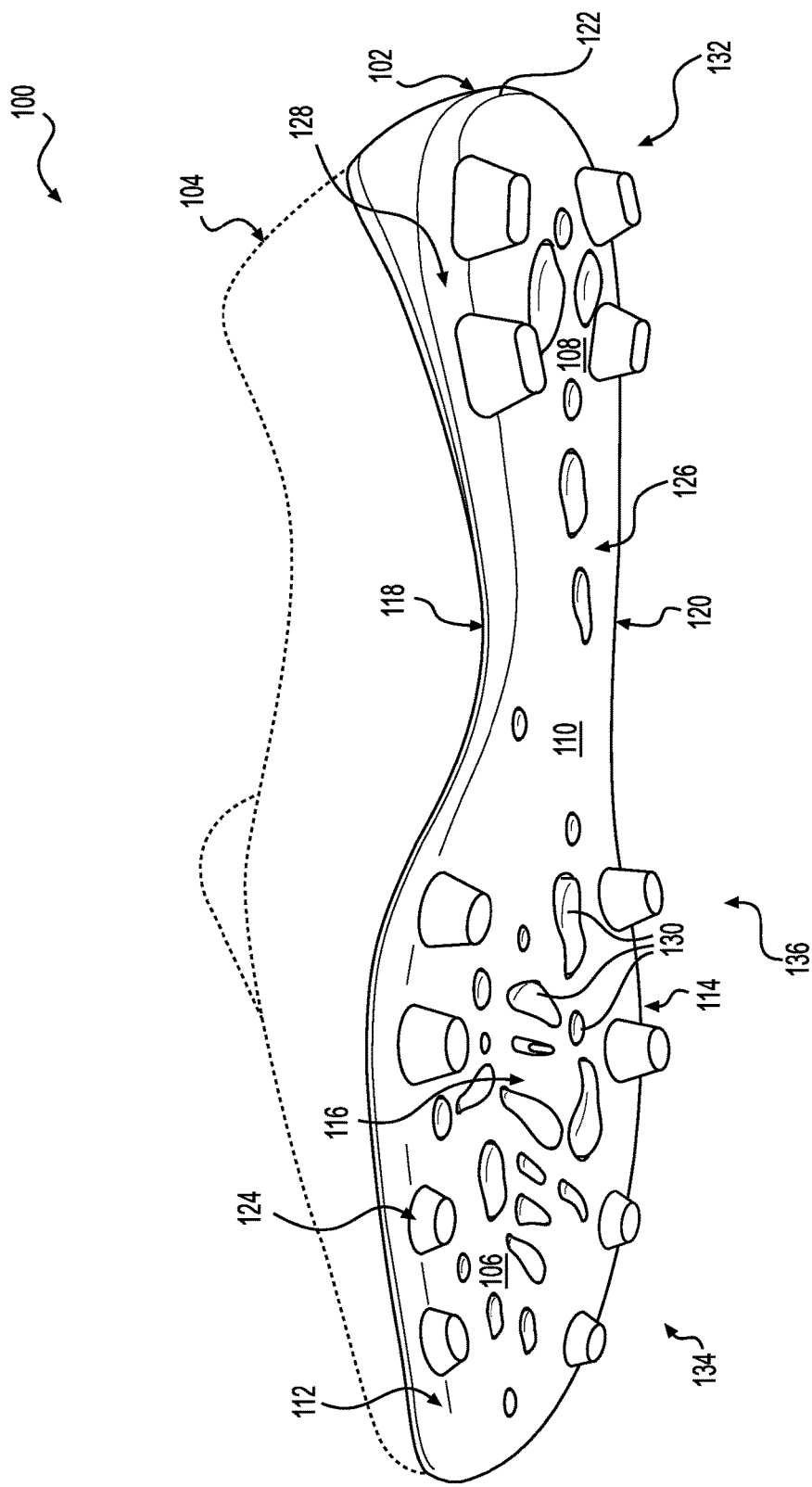
FIG. 1 is a schematic isometric view of an embodiment of an article of footwear including an upper and a sole structure.

The present disclosure is directed to a sole structure for an article of footwear and a method of manufacturing a sole structure. In one embodiment, a sole structure comprises a plate that includes an upper surface and a lower surface. The plate also includes a first aperture that extends from the upper surface to the lower surface of the plate and an optional second aperture that extends from the upper surface to the lower surface of the plate. The plate can also include a first ground-engaging member that extends from the lower surface away from the plate. As used throughout this disclosure, a ground-engaging member is understood to include any ground surface traction element, stud, or cleat. In a particular example, the ground-engaging member can be a stud or cleat. A reservoir may be provided having a first surface and a second surface, the first surface and the second surface being sealed along the periphery of the reservoir; the first surface being located distal to the upper surface, the second surface being located proximal the upper surface. The second surface further defining a first fluid-filled chamber, the first fluid-filled chamber extending through the first aperture into the plate and beyond the lower surface, the first fluid-filled chamber being in fluid communication with the reservoir; and an optional second fluid-filled chamber extending through the second aperture into the plate and beyond the lower surface, the second fluid-filled chamber also being in fluid communication with the reservoir.

In some embodiments, an exterior surface of the first fluid-filled chamber, and when present, an exterior surface of the optional second fluid-filled chamber may be formed of any suitable polymer material. In some cases, the polymer material may be a barrier material having a gas transmission rate for nitrogen gas of less than about 5 $cm^3/m^2 \cdot atm \cdot day$. The barrier material may be a multi-layer polymer material.

In some cases, the polymer material may comprise a hydrophilic polymer material. The hydrophilic polymer material can comprise a polymer material capable of absorbing water. For example, the polymer material capable of absorbing water can be a polymer material capable of absorbing at least about 10 percent by weight of water, based on the dry weight of the polymer material. In another example, the polymer material capable of absorbing water can be a polymer material capable of absorbing at least about 50 percent by weight of water, based on the dry weight of the polymer material. The polymer material capable of absorbing water can comprise a thermoplastic polyurethane. In some cases, the polymer material may comprise a hydrophilic polymer material. The hydrophilic polymer material can comprise a polymer material capable of absorbing water. For example, the polymer material may have a maximum water absorbing capacity of at least about 10 percent by weight, based on the dry weight of the polymer material. The polymer material may have a maximum water absorbing capacity of from about 10 percent to about 1000 percent by weight, based on the dry weight of the polymer material. In another example, the polymer material may have a maximum water absorbing capacity of at least about 50 percent by weight, based on the dry weight of the polymer material. The polymer material capable of absorbing water can comprise a thermoplastic polyurethane.

In a particular example of a sole structure, an outer surface of the fluid-filled chamber extending through an aperture from the upper surface to beyond the lower surface of a plate can be formed of a polymer material capable of absorbing water.

In some embodiments, the first fluid-filled chamber may further comprise a first fluid-filled chamber side wall, the optional second fluid-filled chamber may further comprise a second fluid-filled chamber side wall. The first fluid-filled chamber side wall may be in a fixed relationship to the first aperture and when present, the second fluid-filled chamber side wall may be in a fixed relationship with the second aperture.

In some embodiments, the first fluid-filled chamber may further comprise a first fluid-filled chamber side wall, the optional second fluid-filled chamber may further comprise a second fluid-filled chamber side wall. The first fluid-filled chamber side wall may not be in a fixed relationship to the first aperture and when present, the second fluid-filled chamber side wall may not be in a fixed relationship with the second aperture.

In some embodiments, the plate may have a first flexibility and the second surface may have a second flexibility. In some cases, the first flexibility is less than the second flexibility.

In some embodiments, the plate may include a second ground-engaging member spaced from the first ground-engaging member. The first fluid-filled chamber and the optional second fluid-filled chamber may be located between the first ground-engaging member and the second ground-engaging member. In other embodiments, the plate may include one or more ground-engaging members. Also, one or more fluid-filled chambers may be located between any selected ground-engaging members.

In some embodiments, the sole structure may be attached to an upper of an article of footwear.

In some embodiments, when used in an article of footwear, the sole structure is effective to reduce the amount of debris adsorbed to the exterior surface of the sole. For example, when the article of footwear having the sole structure is worn is a 30 minute wear test on a wet grass field, a weight of debris adsorbed to the exterior surface of the sole structure is at least about 15 percent less than a weight of debris adsorbed to an exterior surface of a control article of footwear, where the control article of footwear is identical to the article of footwear except that the control article of footwear does not include the sole structure. The weight of debris adsorbed to the article of footwear can be at least about 20 percent less than the weight of debris adsorbed to the control article of footwear. The weight of debris adsorbed by the article of footwear can be at least about 30 percent less than the weight of debris adsorbed to the control article of footwear.

The present disclosure is also directed to a method of manufacturing a sole structure by providing a plate, the plate including an upper surface and a lower surface, the plate including a first aperture from the upper surface to the lower surface of the plate and an optional second aperture from the upper surface to the lower surface of the plate. The plate including a first ground-engaging member extending from the lower surface away from the plate. Forming a first fluid-filled chamber extending through the first aperture from the upper surface to beyond the lower surface and an optional second fluid-filled chamber extending through the optional second aperture from the upper surface to the lower surface of the plate.

The forming step may include the steps of locating the plate in a first mold portion, locating a first sheet of a polymer material in the first mold portion such that the plate is between the first mold portion and the first sheet, locating a second sheet of a polymer material in the first mold portion such that the first sheet is between the plate and the second sheet, compressing the first sheet and the second sheet together between the first mold portion and a second mold portion to form a peripheral bond that joins the first sheet and the second sheet around a periphery of a reservoir. Forming a first surface from the first sheet, the first surface extending through the first aperture and beyond the lower surface and, when present, through the optional second aperture and beyond the lower surface, and sealing the first sheet to the second sheet to form the reservoir to enclose a fluid within the reservoir and between the first sheet and the second sheet.

In some embodiments, the method may further comprise a feeder hose which may dispense the fluid into the reservoir.

In some embodiments, the method may further comprise a vacuum which may be used to extend the first surface of the first sheet through the first aperture and beyond the lower surface, and, when present, extend the first surface of the first sheet through the optional second aperture and beyond the lower surface.

In some embodiments, the method may further comprise the plate having a first flexibility and the first surface having a second flexibility.

In some embodiments, the method may further comprise forming an exterior surface of the first fluid-filled chamber, and when present, an exterior surface of the optional second fluid-filled chamber may be formed of any suitable polymer material. In some cases, the polymer material comprises a barrier material having a gas transmission rate for nitrogen gas of less than about 5 cm³/m²·atm·day.

In some embodiments, the first fluid-filled chamber may further comprise a first fluid-filled chamber side wall, the optional second fluid-filled chamber may further comprise a second fluid-filled chamber side wall. The first fluid-filled chamber side wall may be in a fixed relationship with the first aperture and when present, the second fluid-filled chamber side wall may be in a fixed relationship with the second aperture.

In some embodiments, the first fluid-filled chamber may further comprise a first fluid-filled chamber side wall, the optional second fluid-filled chamber may further comprise a second fluid-filled chamber side wall. The first fluid-filled chamber side wall may not be in a fixed relationship with the first aperture and when present, the second fluid-filled chamber side wall may not be in a fixed relationship with the second aperture.

In some embodiments, the method may further comprise the plate including a second ground-engaging member spaced from the first ground-engaging member, and the first fluid-filled chamber and the optional second fluid-filled chamber may be located between the first ground-engaging member and the second ground-engaging member. In other embodiments, the plate may include one or more ground-engaging members. Also, one or more fluid-filled chambers may be located between any ground-engaging members.

In some embodiments, the method may further comprise attaching an upper to the sole structure.

Other systems, methods, features, and advantages of the embodiments will be, or will become, apparent to one of ordinary skill in the art upon examination of the following figures and detailed description. It is intended that all such additional systems, methods, features, and advantages be included within this description, be within the scope of the embodiments, and be protected by the following claims. Both the foregoing description and the following description are exemplary and explanatory, and are intended to provide further explanation of the embodiments as claimed.

Figure 2:
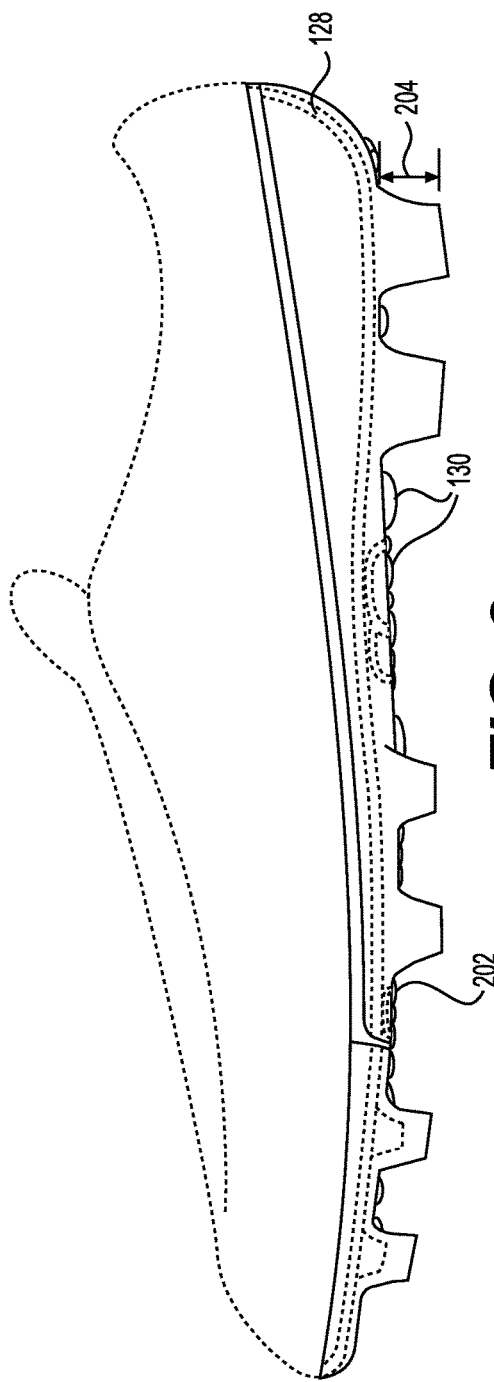
FIG. 2 is a side profile view of the article of footwear of FIG. 1.
Figure 3:
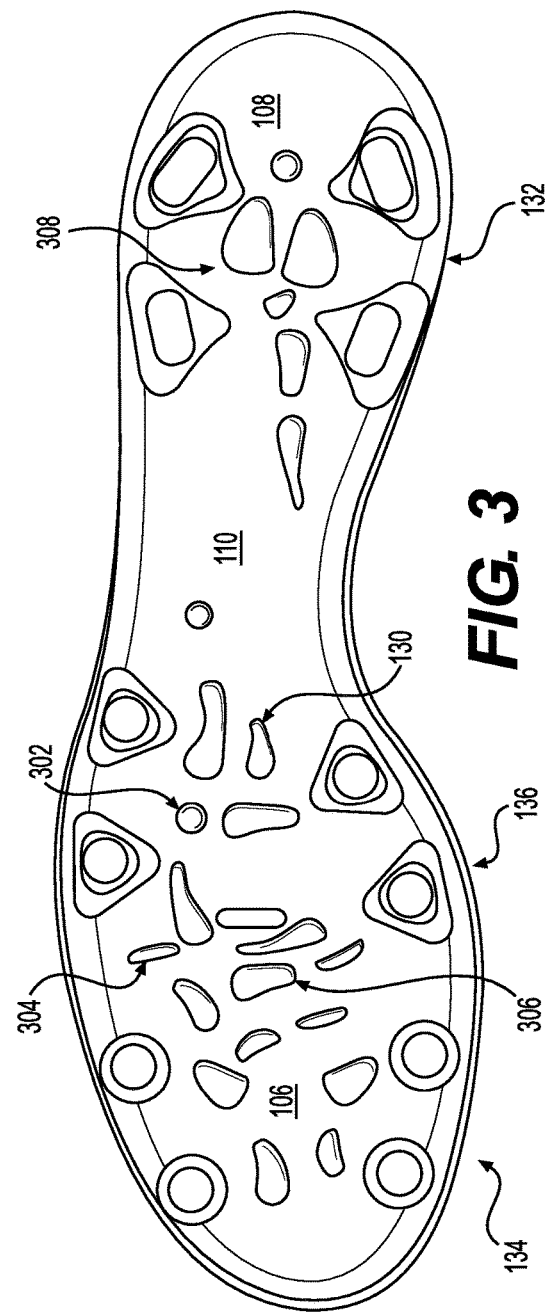
FIG. 3 is a plan view of a lower surface of the article of footwear of FIG. 1.

FIGS. 1-3 illustrate various views of an article of footwear 100 including sole structure 102. Although the figures depict article of footwear 100 in the form of a specific type of article, the provisions discussed below for article of footwear 100 may be applied to any kind of article of footwear. In other embodiments, therefore, these provisions could be incorporated into various kinds of footwear including, but not limited to: soccer shoes, soccer cleats, soccer boots, cleats, football boots, baseball shoes, hiking boots, football shoes, sneakers, rugby shoes, basketball shoes, track shoes, snow shoes, firm ground shoes, as well as other kinds of shoes.

Article of footwear 100 may include an upper 104 as well as a sole structure 102. Generally, upper 104 may be any type of upper. In particular, upper 104 may have any design, shape, size, and/or color. Upper 104 may be any known or later developed upper structure or design. For example, in embodiments where article of footwear is a soccer shoe, upper 104 may be a low top upper with laces. In other embodiments, article of footwear may be a baseball shoe having a high top upper. A structure and design for the upper 104 may be selected that is suitable for a desired type of article 100 and intended use.

Sole structure 102 is secured to upper 104 and extends between the foot and the ground when article of footwear 100 is worn. Sole structure 102 may be any known or later developed sole structure and design suitable for a desired article of footwear 100. In different embodiments, sole structure 102 may include different components. For example, sole structure 102 may include an outsole, a midsole, insole, and/or a lasting board, made of known or later developed material(s) suitable for a desired use or activity. In some cases, one or more of these components may be optional.

In some embodiments, sole structure 102 may comprise an entirety of an outsole of article of footwear 100. In other embodiments, a sole structure may comprise a portion of an outsole of an article of footwear, including, but not limited to one or more of a forefoot region, a mid-foot region, and/or a heel region. In other embodiments, different configurations of a sole structure may be included in an article of footwear. For purposes of illustration, in various embodiments herein a sole structure is shown in isolation. In other embodiments, however, the sole structure could be associated with an upper for an article of footwear 100.

Article of footwear 100 may include a forefoot region 106, a heel region 108, and a mid-foot region 110. Forefoot region 106 may include a toe region 112 and a ball of foot region 114 disposed adjacent the toe region 112. Forefoot region may include a flex region 116 located between the toe region 112 and a ball of foot region 114 that facilitates flexion of the user's toes relative to the foot in active use of the article of footwear. Mid-foot region 110 may be located between the forefoot region 106 and the heel region 108, and may include a shank and/or arch region of the article of footwear. The terms forefoot region 106, heel region 108, mid-foot region 110, toe region 112, ball of foot region 114, and flex region 116 refer to general areas or regions and not to particularly defined structures or boundaries.

Article of footwear 100 may include a medial portion and a lateral portion. Medial portion may include a medial side 118 of the article of footwear 100, including a medial edge. Lateral portion may include a lateral side 120 of the article of footwear 100, including a lateral edge. The terms medial portion, medial side, lateral portion, and lateral side generally refer to relative portions of the article of footwear 100 and not to particularly defined structures or boundaries. Also, the terms medial and lateral may be used to describe relative portions of a particular structure of the article of footwear 100.

In some embodiments, sole structure 102 may be configured to provide traction for article of footwear 100. Sole structure 102 may be disposed as an outsole for an article of footwear 100 that includes a sole plate 122 having one or more ground surface traction elements or plurality of studs 124. Plurality of studs 124 may be used to describe the embodiments shown in the figures.

Plurality of studs 124 may be included to provide additional traction against various types of ground surfaces, such as grass, mud, clay, sod, turf, dirt, as well as other kinds of surfaces. Plurality of studs 124 may be of any design, shape, size, and/or color. In some embodiments, plurality of studs 124 may be bladed, hard-ground and/or round or conical. Plurality of studs 124 may be fixed, molded, or detachable on the bottom of the sole plate 122. Plurality of studs 124 may be plastic, rubber or metal-tipped. In the exemplary embodiment, plurality of studs 124 may further comprise a set of heel studs 132, a first set of forefoot studs 134, and a second set of forefoot studs 136. Set of heel studs 132 may comprise studs that are generally elongated and may facilitate traction in hard-ground environments. First set of forefoot studs 134 and second set of forefoot studs 136 may both have generally rounded shapes. As seen in FIG. 1, first set of forefoot studs 134 may be shorter than second set of forefoot studs 136. Also, second set of forefoot studs 136 may be shorter than set of heel studs 132. In the exemplary embodiment of FIG. 1, each set of studs includes four studs. In other embodiments, however, each set could be configured with any other number of studs. Structure, design, material(s), and construction for the plurality of studs 124 may be selected, including a number and configuration of plurality of studs 124 that is suitable for a desired type of article of footwear 100 and intended use.

As shown in FIG. 1, embodiments of a sole structure 102 may include provisions to prevent the accumulation of material or debris on a ground contacting surface 126 of the sole structure 102. In an exemplary embodiment, these provisions may include an inner sole assembly 128 having protruding fluid-filled chambers 130. Fluid-filled chambers 130 protrude through a sole plate 122. Fluid-filled chambers 130 may have a resilient characteristic to prevent ground surface material from accumulating on the ground contacting surface 126.

Inner sole assembly 128 may include one or more fluid-filled chambers 130 having an exposed surface. In some embodiments, fluid-filled chambers 130 may be of varying sizes and shapes. Fluid-filled chambers 130 may be circular, oval, irregular, cylindrical, polygonal, rectangular, conical, elliptical, symmetrical, non-symmetrical, tear drop, geometric, non-geometric as well as other kinds of shapes. In an exemplary embodiment, fluid-filled chamber may be a combination of circular, oval, and irregular shapes. A design and configuration of inner sole assembly 128 may be selected that is suitable for a desired configuration of an article of footwear 100 and its intended use.

As shown in FIG. 2, inner sole assembly 128 may be disposed on an inner sole plate surface 202. Inner sole assembly 128 may include one or more fluid-filled chambers 130 of varying height. Fluid-filled chambers 130 could have varying heights that are approximately 10% to 50% of the stud height 204, as discussed in further detail below.

As shown in FIG. 3, in some embodiments an article of footwear 100 may include multiple fluid-filled chambers 130. In some embodiments, one or more fluid-filled chambers may be concentrated in the forefoot region 106. In other embodiments, one or more fluid-filled chambers may be situated in the mid-foot region 110. Also, there could be one or more number of fluid-filled chambers in the heel region 108. In some embodiments, there could be a combination of multiple fluid-filled chambers 130 located throughout the outsole. In the exemplary embodiment, a combination of circular and irregular shaped fluid-filled chambers 130 are located between the plurality of studs 124 in the forefoot region 106. Circular fluid-filled chamber 302, elliptical fluid-filled chamber 304, and irregular shaped fluid-filled chamber 306 are located in the forefoot region 106. In the heel region 108 there could be four irregular shaped fluid-filled chambers 308. A design and configuration of multiple fluid-filled chambers 130 may be selected that is suitable for a desired configuration of an article of footwear 100 and its intended use.

Figure 4:
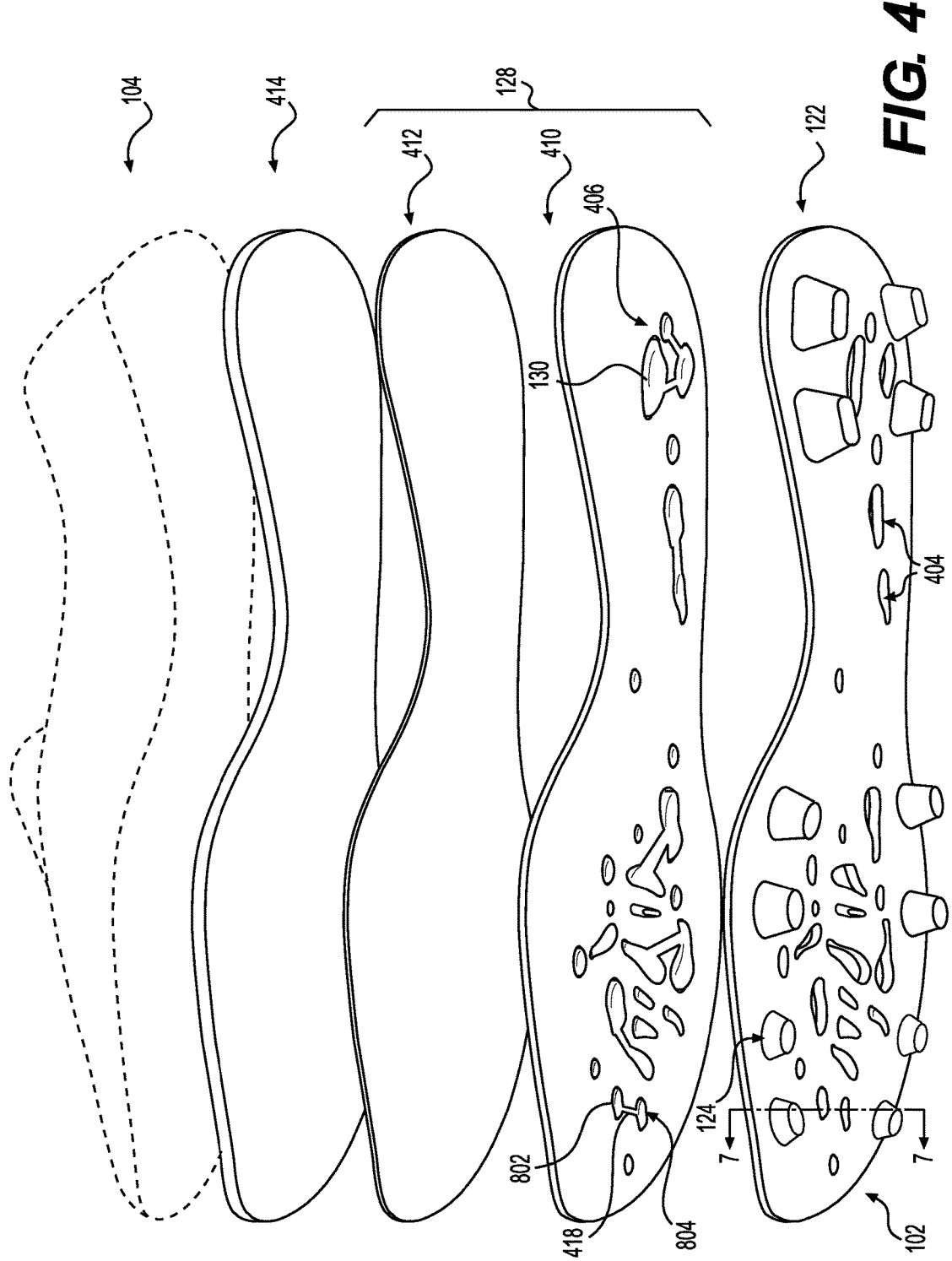
FIG. 4 is an exploded perspective view of an embodiment of the article of footwear of FIGS. 1-3, illustrating an embodiment of the sole structure.

FIG. 4 is an exploded perspective view of the article of footwear 100 of FIGS. 1-3, illustrating an embodiment of the sole structure 102 for the article of footwear 100. As shown in FIG. 4, in some embodiments the article of footwear 100 may include sole plate 122 having plurality of studs 124 fixed or molded to the sole plate. The sole plate 122 may have holes or apertures 404 that may have the same contour as the fluid-filled chambers 130. Inner sole assembly 128 may include a first layer 410 that forms the fluid-filled chambers 130. Inner sole assembly 128 may also include, a second layer 412 that bonds to the first layer forming reservoirs 418 and fluid-filled chambers 130. For example, first fluid-filled chamber 802 may be in fluid communication with second fluid-filled chamber 804 through reservoir 418. Alternatively, region 406 shows three fluid-filled chambers interconnected through reservoirs. One or more fluid-filled chambers 130 may be interconnected in various manners that may be selected that is suitable for a desired article of footwear 100 and intended use. An optional lasting board 414 may be positioned on the inner surface of the second layer in some embodiments.

The first layer 410 and the second layer 412 could be made of a variety of different materials. In some embodiments, the first layer 410 may be made of a polyurethane plastic. Also, in some embodiments, the second layer 412 may be made of a polyurethane plastic. The first layer 410 and second layer 412 may be any material with similar characteristics as a polyurethane plastic, such as, thermoplastic elastomer, elastic material, rubber material, resilient material, as well as any other material.

Fluid-filled chambers 130 may protrude through holes or apertures 404 of the sole plate 122. The fluid-filled chambers may be in fixed relationship with apertures 404. In some cases, the fluid-filled chambers 130 may not be in a fixed relationship with the apertures 404. The sole plate 122 and fluid-filled chambers 130 may be in contact with a ground surface upon intended use of an article of footwear.

Figure 5:
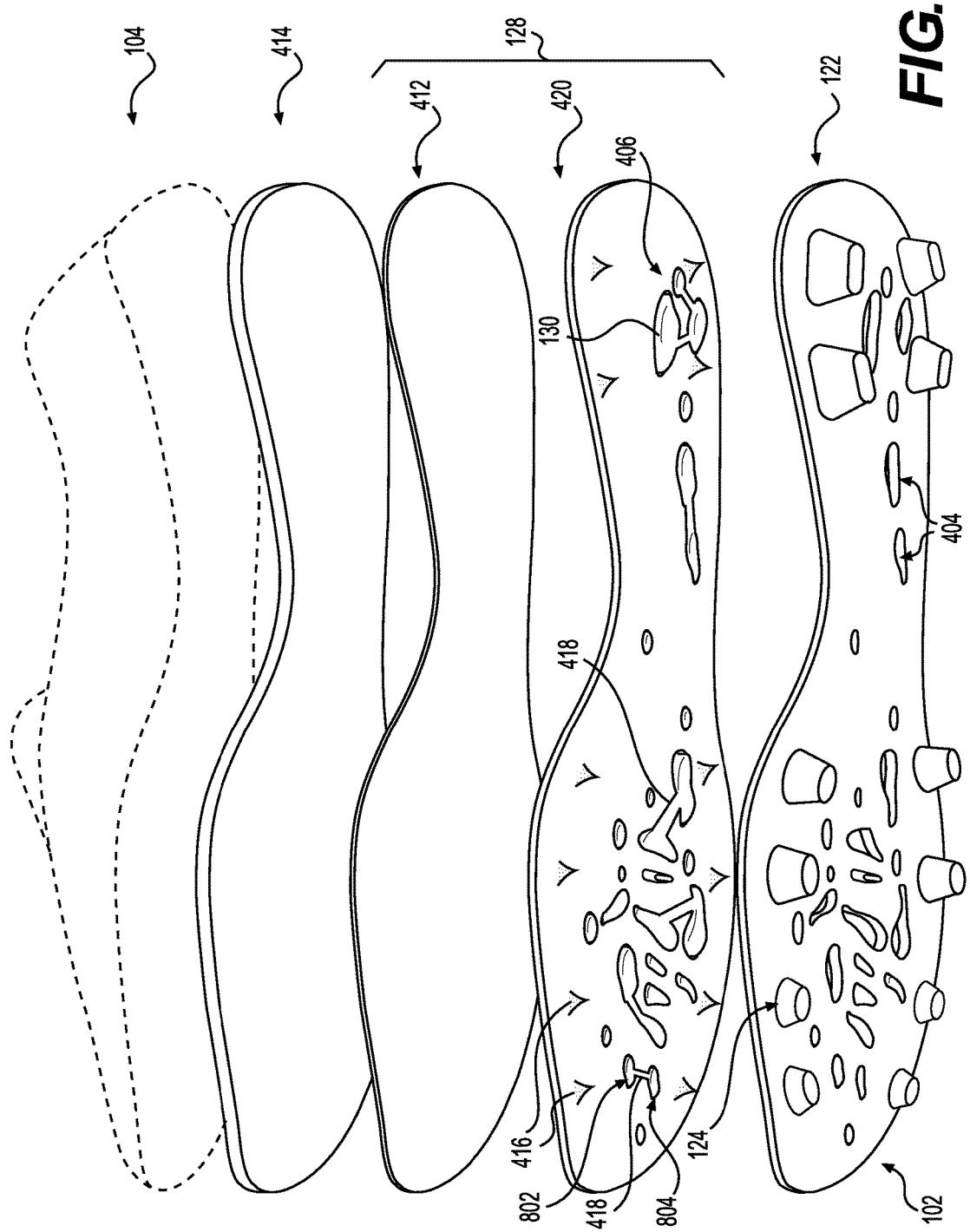
FIG. 5 is an exploded perspective view of an embodiment of the article of footwear of FIGS. 1-3, illustrating another embodiment of the sole structure.

FIG. 5 shows another embodiment of an exploded perspective view of the article of footwear 100, illustrating provisions for aligning inner sole assembly 128 with a sole plate 122. In some embodiments, for example, an inner sole assembly 128 can include alignment members 416. In the exemplary embodiment shown in FIG. 5, first layer 420 may incorporate alignment members 416 that are configured to align with the plurality of studs 124. Alternatively, FIG. 4 shows an embodiment of the first layer 410 without alignment members 416.

Figure 6:
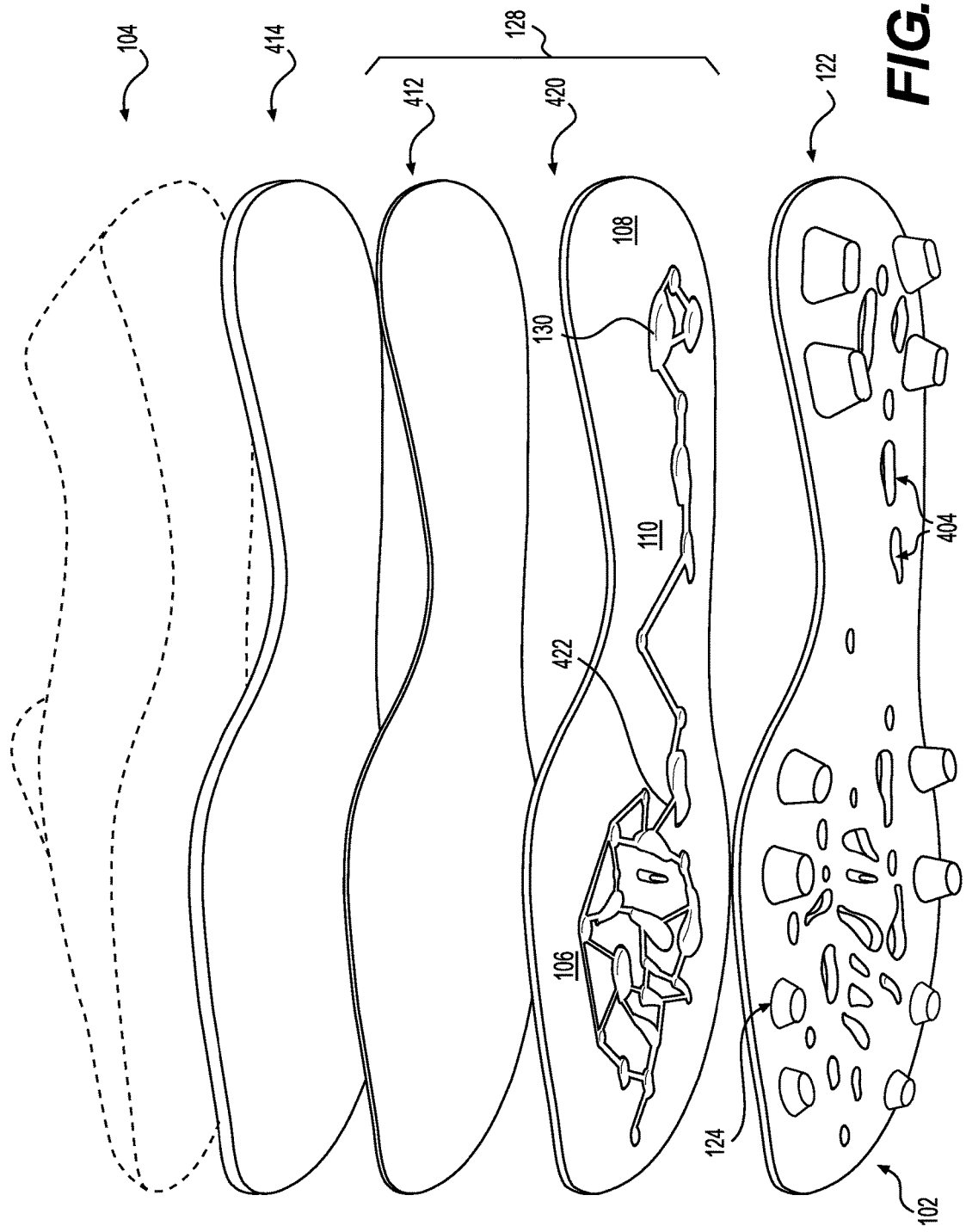
FIG. 6 is an exploded perspective view of an embodiment of the article of footwear of FIGS. 1-3, illustrating another embodiment of the sole structure.

FIG. 6 shows another embodiment of an exploded perspective view of the article of footwear 100, illustrating an embodiment of the sole structure 102 for the article of footwear 100. As shown in FIG. 6, in some embodiments the article of footwear 100 may include sole plate 122 having plurality of studs 124 fixed or molded to the sole plate. The sole plate 122 may have holes or apertures 404 that may have the same contour as the fluid-filled chambers 130. Inner sole assembly 128 may include a first layer 420 that forms the fluid-filled chambers 130. Inner sole assembly 128 may also include, a second layer 412 that bonds to the first layer 420 forming reservoir 422, interconnects all of the fluid-filled chambers 130. Reservoir 422 may provide fluid communication amongst all of the fluid-filled chambers 130. An optional lasting board 414 may be positioned on the inner surface of the second layer.

The protruding fluid-filled chambers 130 may all be interconnected through reservoir 422. Increased pressure may be applied to heel region 108 transmitting fluid in the interconnected fluid-filled chambers 130 and reservoir 422 towards the forefoot region 106, thereby expanding the fluid-filled chambers 130 in the forefoot region 106. Similarly, when increased pressure is applied to the forefoot region 106, the increased pressure transmits fluid in the interconnected fluid-filled chambers 130 and reservoir 422 from the forefoot region 106 towards the heel region 108 and expands the protruding fluid-filled chambers 130 in the heel region 108 The expansion and contraction of the protruding fluid-filled chambers across the sole plate based on the athlete's movement (and thus change in applied pressure) serves to prevent build-up of ground surface material on the outer surface of the sole plate.

Figure 7:
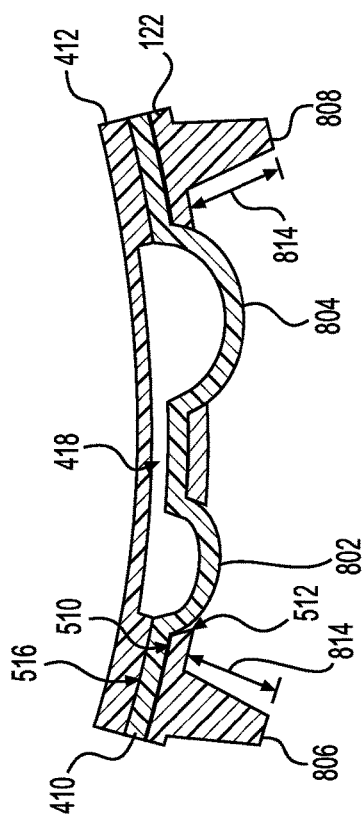
FIG. 7 is a cross-sectional view of an embodiment of the sole structure of FIG. 4 taken along section line 5-5 of FIG. 4.

FIG. 7 is a cross-sectional view of a first embodiment of the sole structure of FIG. 4 taken along section line 4-4 of FIG. 4. As shown in FIG. 7, in some embodiments, a first fluid-filled chamber 802 may be in fluid communication with a second fluid-filled chamber 804 through reservoir 418. First fluid-filled chamber 802, reservoir 418 and second fluid-filled chamber 804 may be formed between a first stud 806 and a second stud 808. Sole plate 122 may have a first stud 806 and a second stud 808 that are fixed or molded to the sole plate 122. The first layer 410 is disposed on the inner sole plate surface 510. First fluid-filled chamber 802 is formed through the hole or aperture 512 of sole plate 122. The second layer 412 is disposed on the inner first layer surface 516. The second layer 412 bonds to the first layer 410 to form a seal around the first fluid-filled chamber 802, the second fluid-filled chamber 804, and the reservoir 418.

In different embodiments, fluid-filled chambers may have varying widths. First fluid-filled chamber 802 may generally be wider than first stud 806. Alternatively, in other cases, first stud 806 may generally be wider than first fluid-filled chamber 802. Still in other embodiments, first fluid-filled chamber 802 may have the same width as first stud 806. In an exemplary embodiment, shown in FIG. 7, first fluid-filled chamber 802 may be wider than first stud 806. In other embodiments, first fluid-filled chamber 802 may have a different width from second fluid-filled chamber 804. Alternative, first fluid-filled chamber 802 and second fluid-filled chamber 804 may have the same width. Varying widths for the fluid-filled chambers of the inner sole assembly may be selected that is suitable for a desired article of footwear 100 and intended use.

Also, as shown in FIG. 7, first fluid-filled chamber 802 and second fluid-filled chamber 804 may have varying heights. As used herein, the height of a chamber may be determined as the distance between a lowest portion of the chamber (e.g., the furthest from sole plate 122) and the lower surface of sole plate 122. First fluid-filled chamber 802 and second fluid-filled chamber 804 could have varying heights that are approximately 10% to 50% of the stud height 814. As used herein, the height of a stud may be determined as the distance between a tip (or end) of the stud and a lower surface of sole plate 122. In some cases, first fluid-filled chamber 802 may have a height that is 15% of the stud height 814. In other cases, first fluid-filled chamber 802 may have a height that is approximately 50% of the stud height 814. In some embodiments, inner sole assembly may have one or more fluid-filled chambers, with each fluid-filled chamber having a different height. For example, a fluid-filled chamber located on the forefoot surface may have a height that is 15% of the stud height 814, while a fluid-filled chamber located on the midsole surface may have a height that is 45% of the stud height 814, and a fluid-filled chamber located on the heel surface may have a height that is 30% of the stud height 814. In the exemplary embodiment shown in FIG. 7, first fluid-filled chamber 802 may have a height that is 25% of the stud height 814 and second fluid-filled chamber 804 may have a height that is 50% of the stud height 814. The fluid-filled chambers of inner sole assembly may have any combination of heights in relation to the stud height. Varying heights for the fluid-filled chamber of the inner sole assembly may be selected that is suitable for a desired article of footwear 100 and intended use.

Figure 8:
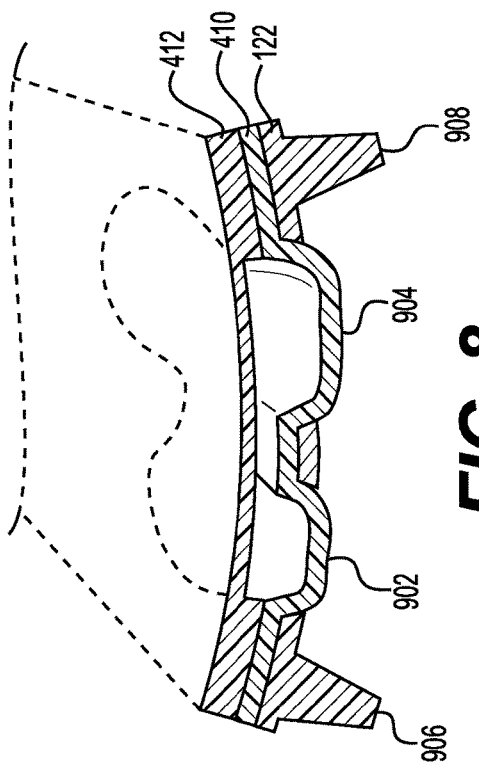
FIG. 8 is a perspective, cross-sectional view of another embodiment of the sole structure of FIG. 4 taken along section line 5-5 of FIG. 4.

As shown in FIG. 8, in some embodiments, first fluid-filled chamber 902 and second fluid-filled chamber 904 may be configured as various shapes, such as, spherical, oval, cylindrical, polygonal, rectangular, conical, elliptical, symmetrical, non-symmetrical, or any other shape. In some cases, first fluid-filled chamber 902 may have a different shape than second fluid-filled chamber 904. Alternatively, in other cases, first fluid-filled chamber 902 may have the same shape as second fluid-filled chamber 904. A number and configuration of first fluid-filled chamber 902 and second fluid-filled chamber 904 may be selected that is suitable for a desired article of footwear 100 and intended use. In the exemplary embodiment shown in FIG. 8, first fluid-filled chamber 902 and second fluid-filled chamber 904 may both be irregular shaped.

The embodiments shown in FIGS. 7 and 8 do not have recesses for receiving alignment members, however, alignment members may be configured in layer 410 to align with the studs of sole plate 122 if suitable for a desired article of footwear and intended use.

Figure 9:
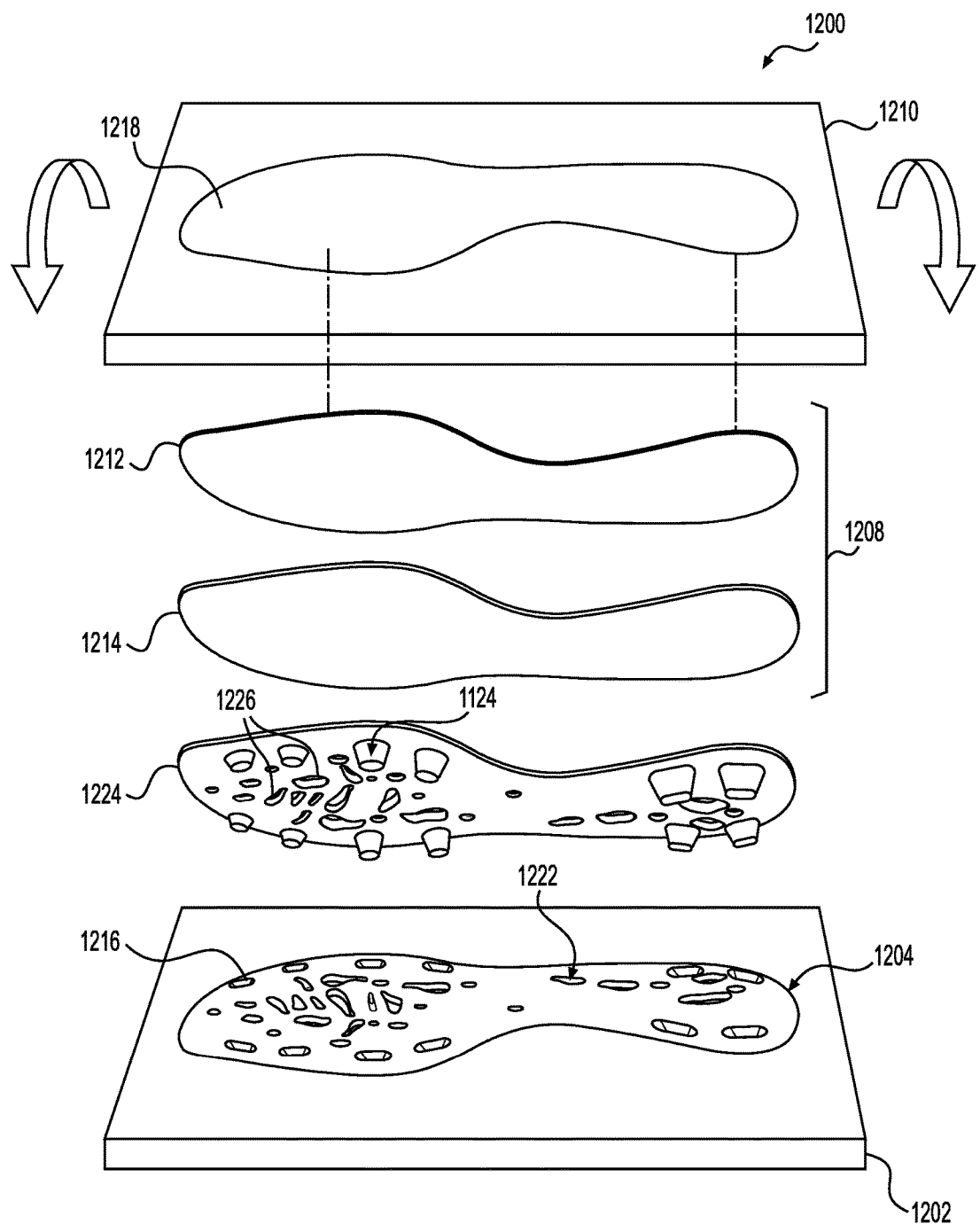
FIG. 9 is an exploded view of an embodiment of a molding system for making an inner sole assembly.

FIG. 9 illustrates an embodiment of a molding system 1200 for molding inner sole assembly 1208. As shown in FIG. 9, lower mold plate 1202 may include at least one lower mold cavity 1204 for molding multiple fluid-filled chambers. In some embodiments, lower mold plate 1202 may include recesses 1216 for aligning with plurality of studs 124 and recesses 1222 for aligning with fluid-filled chambers. As shown in FIG. 9, sole plate 1224 may have plurality of studs 124 and holes or apertures 1226 having similar contours as the fluid-filled chambers. Also shown is a first layer 1214 that may follow the shape or contour of the sole plate 1224 and is a flat sheet. The fluid-filled chambers may be formed by the flat first layer 1214. The second layer 1212 may follow the shape or contour of the sole plate 1224. The second layer 1212 bonds with the first layer 1214 forming a seal around the fluid-filled chambers and reservoir. Also, upper mold plate 1210 may have a cavity 1218 with a similar shape as the contour of the sole plate 1224.

Figure 10:
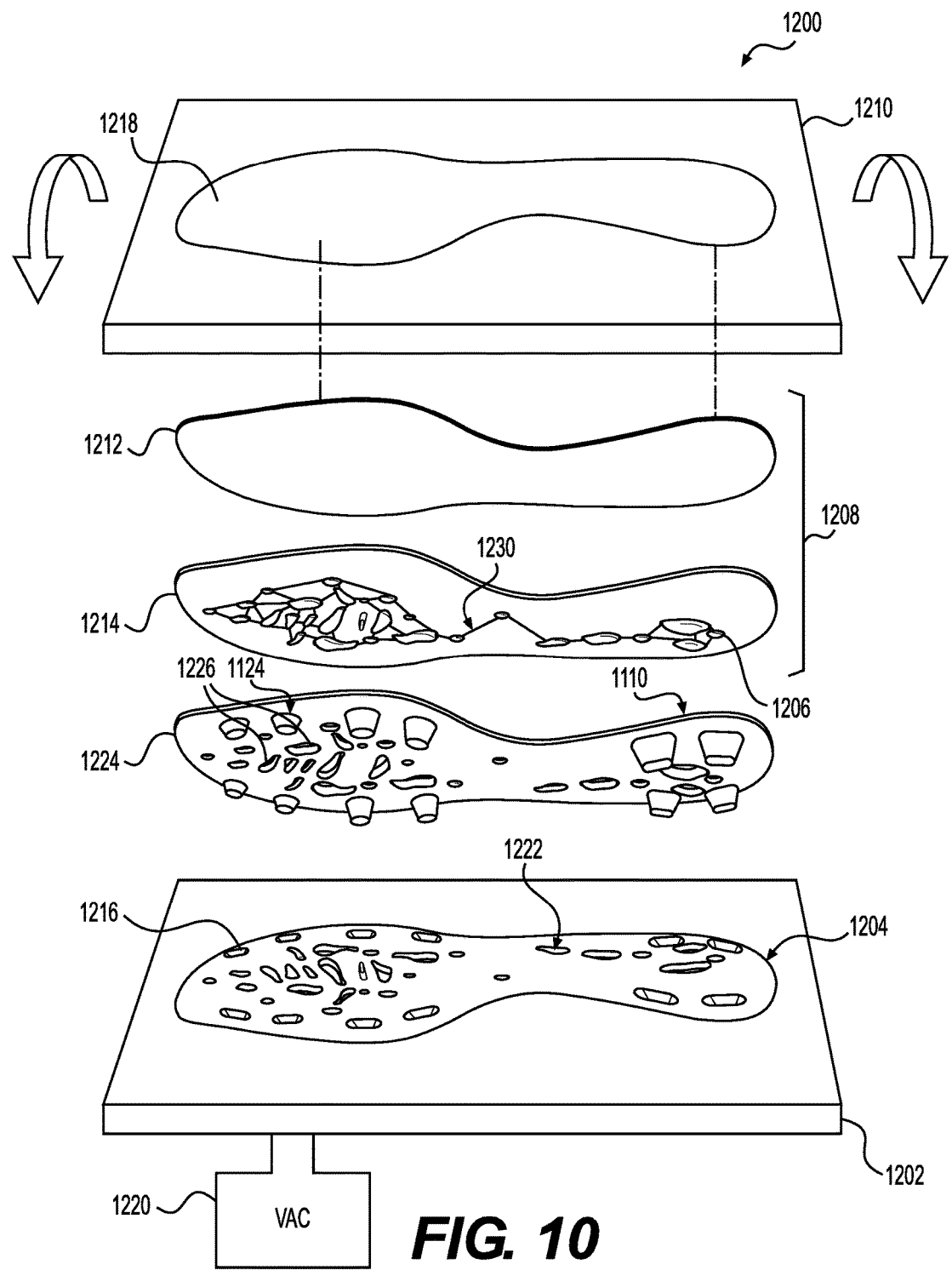
FIG. 10 is an exploded view of an embodiment of a molding system for making an inner sole assembly by using a vacuum system.

FIG. 10 illustrates an embodiment of a molding system 1200 for molding inner sole assembly 1208 with a vacuum system 1220. As shown in FIG. 10, lower mold plate 1202 may include at least one lower mold cavity 1204 for molding multiple fluid-filled chambers 1206. In some embodiments, lower mold plate 1202 may include recesses 1216 for aligning with plurality of studs 124 and recesses 1222 for aligning with fluid-filled chambers 1206. As shown in FIG. 10, sole plate 1224 may have plurality of studs 124 and holes or apertures 1226 having similar contours as the fluid-filled chamber 1206. Also shown is a first layer 1214 that may follow the shape or contour of the sole plate 1224. The fluid-filled chambers 1206 may be formed by the first layer 1214. The periphery of the fluid-filled chamber having a similar shape as the holes or apertures 1226 located in sole plate 1224. The second layer 1212 may follow the shape or contour of the sole plate 1224. The second layer 1212 bonds with the first layer 1214 forming a seal around fluid-filled chambers 1206 and reservoir 1230 allowing fluid communication between all of the fluid-filled chambers. One or more fluid-filled chambers 1206 may be interconnected in various manners that may be selected that is suitable for a desired article of footwear 100 and intended use. Also, upper mold plate 1210 may have a cavity 1218 with a similar shape as the contour of the sole plate 1224.

Figure 11:
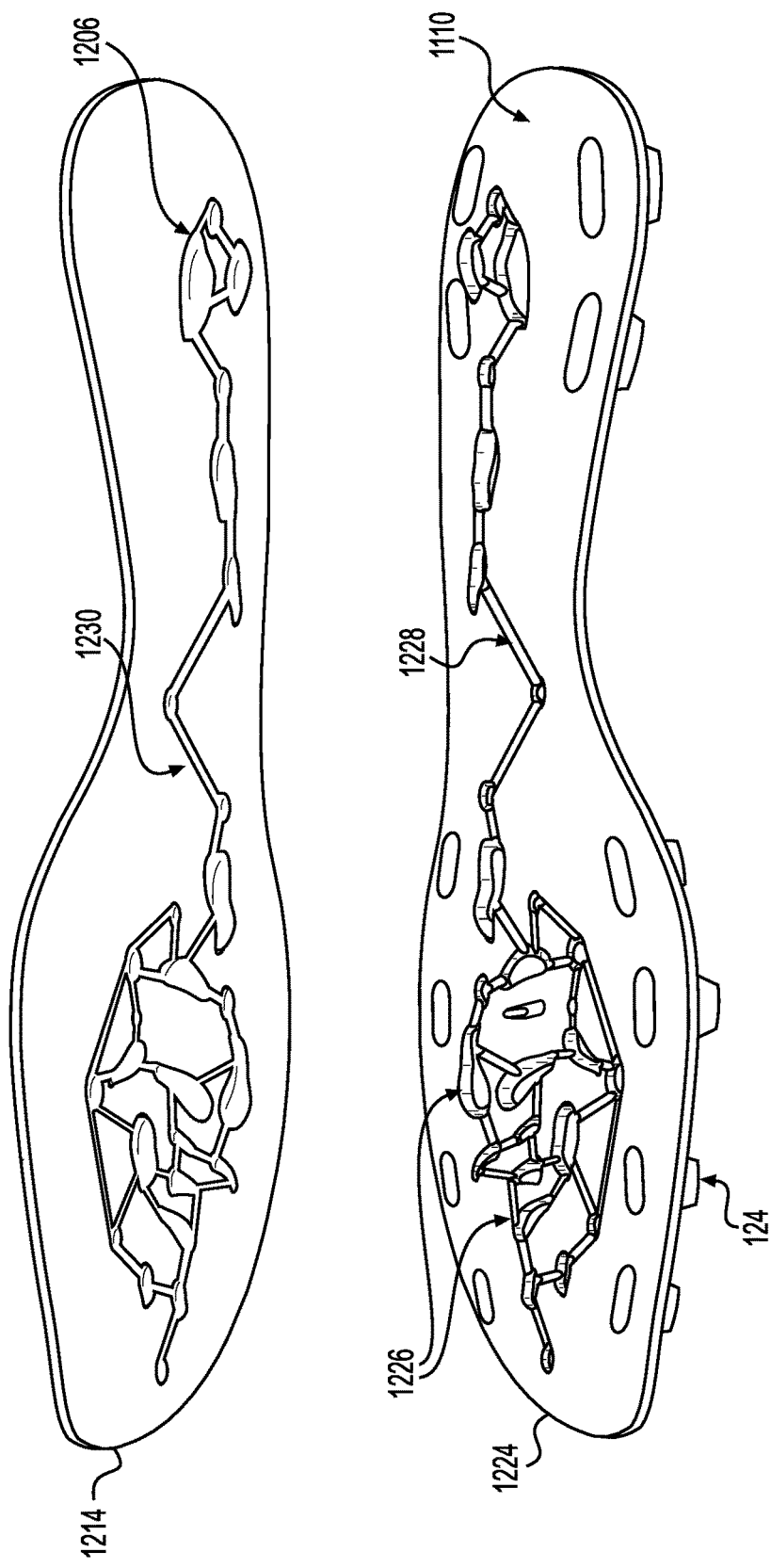
FIG. 11 is a perspective view of the first layer and sole plate of the sole structure.

FIG. 11 illustrates a perspective view of first layer 1214 and sole plate 1224 of FIG. 10. Sole plate 1224 has inner sole plate surface 1110, as shown in FIG. 10. Outer sole plate surface 1112 may have plurality of studs 124 and outer portion of holes or apertures 1226 having similar contours as the fluid-filled chambers 1206. Inner sole plate surface 1110 may have recesses 1228 to align with reservoirs 1230. Reservoirs 1230 may not protrude the sole plate 1224 towards the ground surface. Inner sole plate surface 1110 also shows the inner portion of holes or apertures 1226 of the sole plate 1224. Fluid-filled chambers 1206 may align with holes or apertures 1226 and protrude through the sole plate 1224 towards the ground surface.

FIG. 12 illustrates the fluid communication between two fluid-filled chambers. First fluid-filled chamber 916 may be in fluid communication with second fluid-filled chamber 918 through reservoir 920. The protruding fluid-filled chambers may be connected, so that when increased pressure 928 is applied to the second fluid-filled chamber 918, the increased pressure 928 contracts second fluid-filled chamber 918 and pushes fluid, shown as solid arrows, through reservoir 920 and expands the protruding first fluid-filled chamber 916. Similarly, when increased pressure 930 is applied to first fluid-filled chamber 916, the increased pressure 930 contracts first fluid-filled chamber 916 and pushes fluid, shown as dashed arrows, through reservoir 920 and expands the protruding second fluid-filled chamber 918. The expansion and contraction of the protruding fluid-filled chambers across the sole plate based on the athlete's movements serves to prevent build-up of material on the ground contacting surface of the sole plate.

FIG. 13 illustrates the fluid communication between three fluid-filled chambers. First fluid-filled chamber 910 may be in fluid communication with second fluid-filled chamber 912 and third fluid-filled chamber 914 through first reservoir 922, second reservoir 924, and third reservoir 926. The protruding fluid-filled chambers are connected, so that when increased pressure 928 is applied to the second fluid-filled chamber 912, the increased pressure 928 contracts second fluid-filled chamber 912 and pushes fluid, shown as solid arrows, through first reservoir 922, second reservoir 924, and third reservoir 926 and expands the protruding first fluid-filled chamber 910 and third fluid-filled chamber 914. Similarly, when increased pressure 930 is applied to first fluid-filled chamber 910, the increased pressure 930 contracts first fluid-filled chamber 910 and pushes fluid, shown as dotted arrows, through first reservoir 922, third reservoir 926 and second reservoir 924 and expands the protruding second fluid-filled chamber 912 and third fluid-filled chamber 914. The expansion and contraction of the protruding fluid-filled chambers across the sole plate based on the athlete's movements serves to prevent build-up of material on the ground contacting surface of the sole plate.

Figure 14:
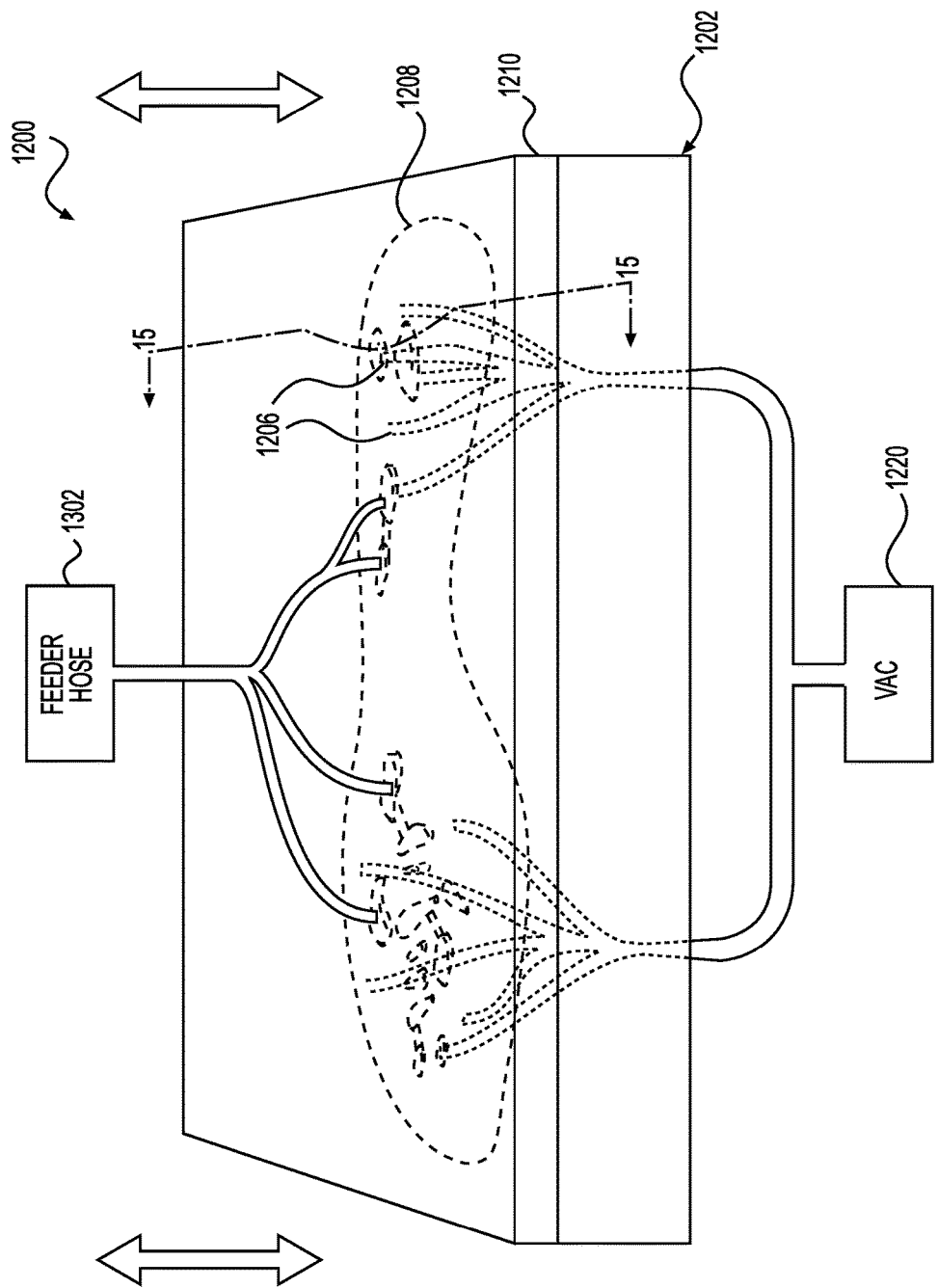
FIG. 14 is a perspective view of a closed molding system of FIG. 10.

In a molding process of FIGS. 9-16, sole plate 1224, first layer 1214 and second layer 1212 may be disposed between the lower mold plate 1202 and the upper mold plate 1210 in registration with the at least one lower mold cavity 1204 and at least one upper mold cavity 1218. The molding process may include any known or later developed heat treatment and/or pressure treatment process, optionally with vacuum 1220. As shown in FIG. 10 and FIG. 14, in some embodiments, in the molding process the first layer 1214 may be drawn by vacuum 1220 into the lower mold cavity 1204 and take a shape and configuration conforming to the shape and configuration of a mold surface of the lower mold cavity 1204.

As shown in FIG. 14, in some embodiments, fluid-filled chambers 1206 may be filled with any fluid, such as, air, liquid, supergases, halogenated hydrocarbons, compressible gas, nitrogen pumping polymers, or another kind of fluid. Feeder hose 1302 may be used to dispense the fluid into fluid-filled chambers 1206. In the exemplary embodiment, nitrogen gas may be diffused into fluid-filled chambers 1206.

Figure 15:
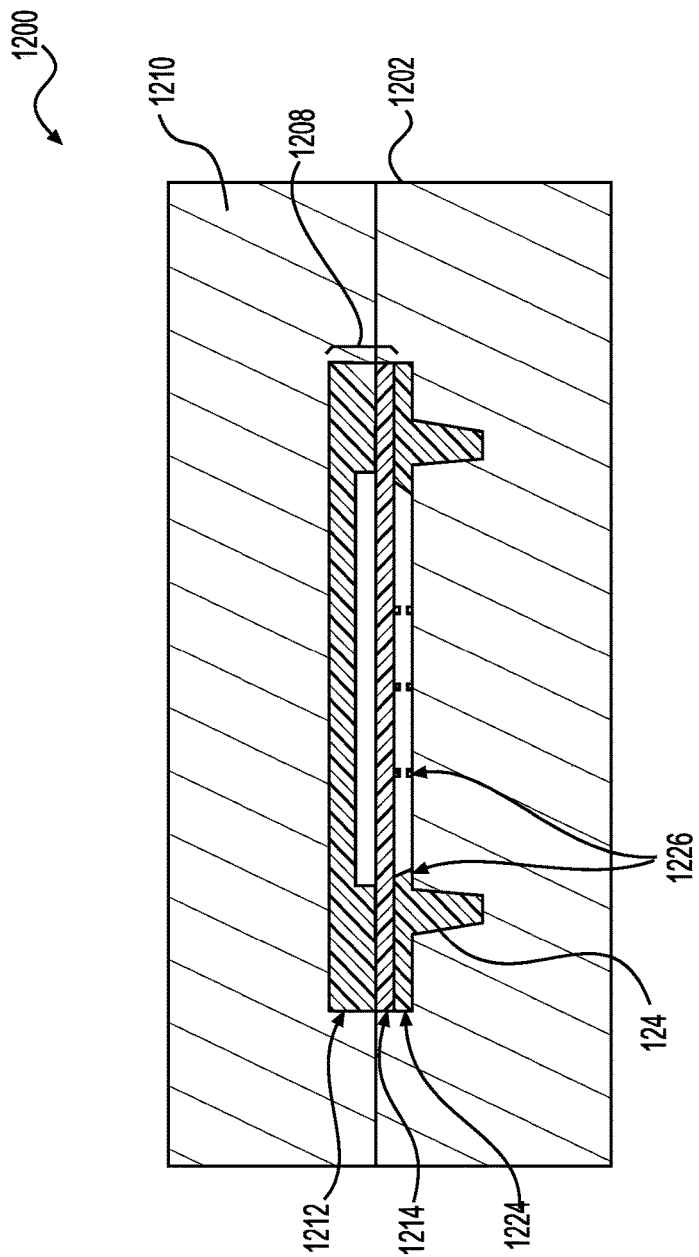
FIG. 15 is a cross-sectional view of a closed molding system of FIG. 10 prior to applying the vacuum system.

FIG. 15 is a cross-sectional view taken along section lines 8-8 of FIG. 14 illustrating in cross-section of an inner sole assembly 1208 of molding system 1200. Prior to utilizing the vacuum system, first layer 1214 is positioned on the inner surface of the sole plate 1224. Then second layer 1212 is positioned on the inner surface of the first layer 1214 to form a seal around the periphery of the layers.

Figure 16:
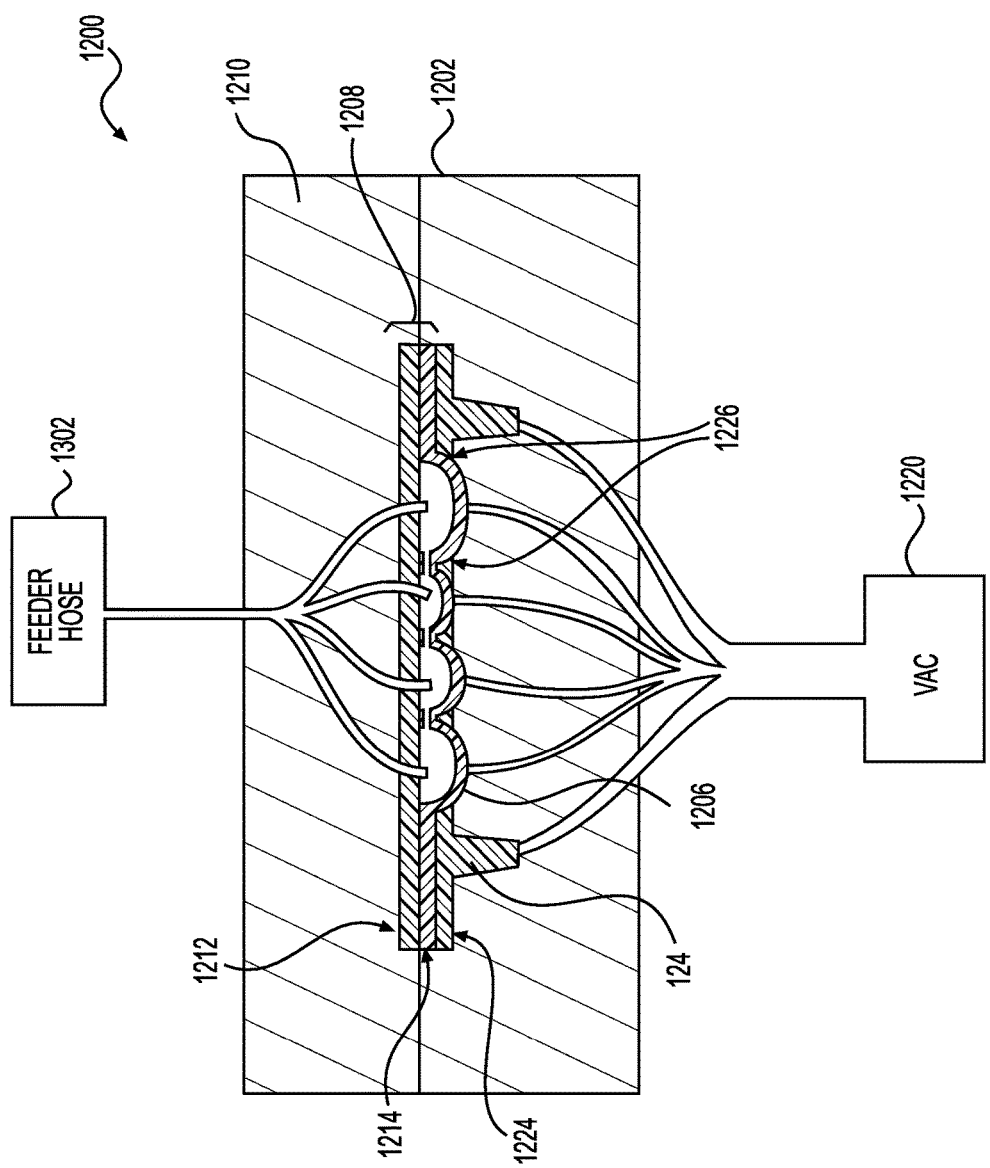
FIG. 16 is a cross-sectional view of a closed molding system of FIG. 10 with the vacuum system and feeder hose.

FIG. 16 is a cross-sectional view taken along section lines 8-8 of FIG. 14 illustrating in cross-section of a molded inner sole assembly 1208 of molding system 1200. Vacuum 1220 may draw the first layer 1214 through the holes or apertures 1226 of sole plate 1224. Feeder hose 1302 may be used to dispense the fluid into fluid-filled chambers 1206. The molding system may be opened to remove the molded inner sole assembly 1208. The molded inner sole assembly 1208 reduces the amount of material or debris accumulating on the ground surface of the sole structure. The molded inner sole assembly may be attached to any upper of an article of footwear.

Mold materials for a molding process in the molding system of FIGS. 9-16 may be any known or later developed molding materials suitable for a desired sole structure. In some embodiments, the molding material may be any form of a plastic material. In different embodiments, however, various types of molding material may be used to form an inner sole assembly 1208 using molding system 1200. In some embodiments, the molding material may include, but is not limited to, any one or more of the following materials: natural or synthetic rubber, hard foam, plastics, polymers, nylon, polyurethane, thermoplastic polyurethane, as well as any other deformable or rigid materials. Any other materials may be used as the molding material. In addition, in some embodiments an inner sole assembly may be produced using more than one molding material. In an embodiment, the molding materials could be made of thermoplastic polyurethane.

The molding material could have various gas transmission rates. The polymer material may include a barrier material having a gas transmission rate for nitrogen gas of less than about 5 $cm^3/m^2 \cdot atm \cdot day$.

The sole structure of the article of footwear may have variable compressibility or resiliency factors. For example, sole plate 1224 may have a first compressibility or resiliency factor. Inner sole assembly 1208 may have a second compressibility or resiliency factor. The first compressibility or resiliency factor of sole plate 1224 may be less than the second compressibility or resiliency factor of the inner sole assembly 1208. Sole plate 1224 may be formed from a hard plastic or synthetic that comes into contact with the ground surface that is not compressible or resilient. The inner sole assembly may be formed from a resilient material that also comes into contact with the ground surface. In an exemplary embodiment, the sole structure provides a ground contacting surface that has hard portions as well as soft, resilient portions.

FIGS. 17 to 24 illustrate an exemplary operation of an embodiment of the sole structure. As shown in FIGS. 17-24, in some embodiments a sole structure may operate to prevent accumulation of ground surface material on a lower surface of an article of footwear in active use of the article of footwear.

Figure 17:
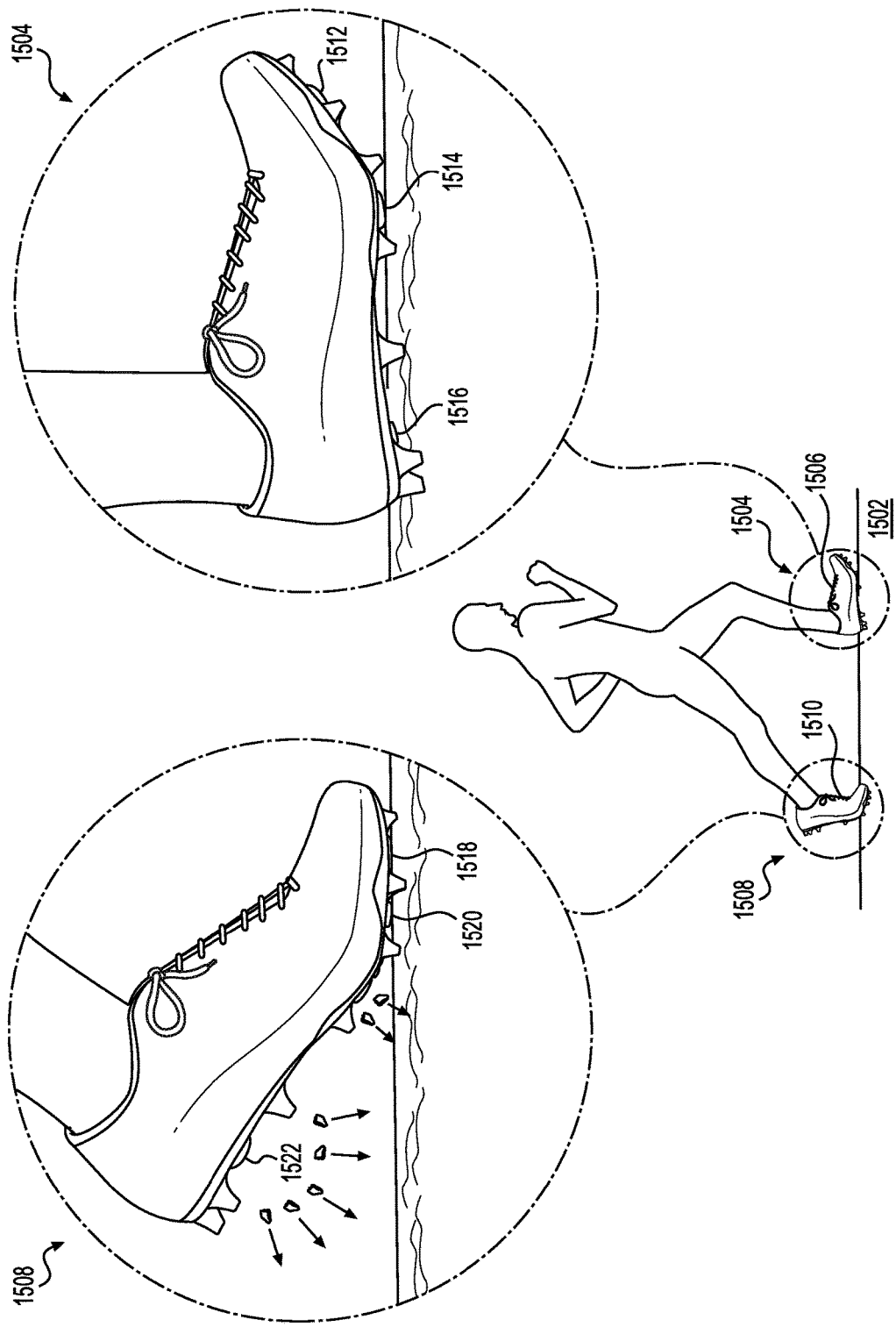
FIG. 17 is a schematic snap-shot profile view of an athlete, illustrating operation of an embodiment of an article of footwear including the sole structure.

FIG. 17 is a schematic snap-shot profile view of an athlete, illustrating functional characteristics and operation of an embodiment of a sole structure in active use of an article of footwear. In FIG. 17, an athlete is shown in stride during normal athletic activity, such as running, playing soccer or another sport, etc., on a ground surface. The ground surface 1502 may include compactable ground surface material, such as mud, gravel, sand, clay, slush (snow, ice, or frost), etc., or various combinations thereof. In FIG. 17, the athlete's left foot 1506 is extended in front of the athlete's body in a heel strike state 1504 of a stride cycle, where a strike force and weight of the athlete is being transmitted to the ground surface. In this manner, a compression force between the sole structure of the article of footwear and the ground surface progressively is generated in the heel region to the toe region of the article of footwear. In FIG. 17, the athlete's right foot 1510 is extended in back of the athlete's body in a toe off state 1508 of a stride cycle, where a force and weight of the athlete generally is released. In this manner, a compression force between the sole structure of the article of footwear and the ground surface progressively is released from the heel region to the toe region of the article of footwear.

In FIG. 17, the heel strike state 1504 is shown in enlarged view in the upper right hand portion of the figure, and the toe off state 1508 is shown in enlarged view in the upper left hand portion of the figure. Although functional characteristics and operation of the sole structure are described in FIG. 17 with respect to a stride cycle including heel strike and toe off states, this stride cycle is exemplary only to illustrate different functional characteristics and operation states of the sole structure in active use of the article of footwear. Those skilled in the art readily will appreciate that the sole structure may be used with similar functional characteristics and operation in other stride cycles or methods of active use of the article of footwear, such as running on the balls of the feet, running with a lateral mid-foot strike cycle, trapping a soccer ball, or any other active movement.

In the exemplary stride cycle shown in FIG. 17, a first article of footwear (left shoe) 1506 is shown with fluid-filled chamber in three different operation states associated with a heel strike state 1504 of the stride cycle. A first fluid-filled chamber 1512 located in the toe region of the forefoot region is shown in a fully non-compressed state, where the exposed surface of the fluid-filled chamber is fully extended in a dome shape. A second fluid-filled chamber 1514 located in the ball of the foot region of the forefoot region is shown in a partially compressed state, where the exposed surface of the fluid-filled chamber is partially collapsed in a dimpled dome shape. A third fluid-filled chamber 1516 located in the heel region is shown in a fully compressed state, where the exposed surface of the fluid-filled chamber is fully collapsed to lay substantially flat proximal to the lower sole plate surface of the article of footwear.

In the exemplary stride cycle shown in FIG. 17, a second article of footwear (right shoe) 1510 is shown with fluid-filled chamber in three different operation states associated with a toe off state 1508 of the stride cycle. A first fluid-filled chamber 1518 located in the toe region of the forefoot area is shown in a fully compressed state, where the exposed surface of the fluid-filled chamber is fully collapsed to lay substantially flat proximal to the lower sole plate surface of the article of footwear. In this state, a thrust force and weight of the athlete is being transferred to the ground surface. A second fluid-filled chamber 1520 located in the ball of the foot region of the forefoot region is shown in a partially compressed state (partially non-compressed or released state), where the exposed surface of the fluid-filled chamber is partially collapsed (partially released) in a dimpled dome shape. A third fluid-filled chamber 1522 located in the heel region is shown in a fully non-compressed state (fully released state), where the exposed surface of the fluid-filled chamber is fully extended in a dome shape.

FIGS. 18-24 illustrate the operation of a two fluid-filled chambers connected through reservoir 1620 with respect to compression forces progressively generated and released between the article of footwear and the ground surface, to prevent accumulation of ground surface material on the lower surface of the article of footwear in active use of the article of footwear. In FIGS. 18-24 an exemplary sole structure is shown in cross-sectional view to illustrate physical deformation associated with external compression forces applied to, and internal reactive forces generated by a first fluid-filled chamber 1604 and second fluid-filled chamber 1618 of the sole structure 1614. FIGS. 18-24 show sole plate 1606 having a first stud 1602 and second stud 1603. An inner sole assembly having a first layer 1608 and second layer 1610. First layer 1608 forms first fluid-filled chamber 1604 and second fluid-filled chamber 1618 that protrude through sole plate 1606. Second layer 1610 bonds with the first layer 1608 to form a seal around first fluid-filled chamber 1604, second fluid-filled chamber 1618 and reservoir 1620.

Figure 18:
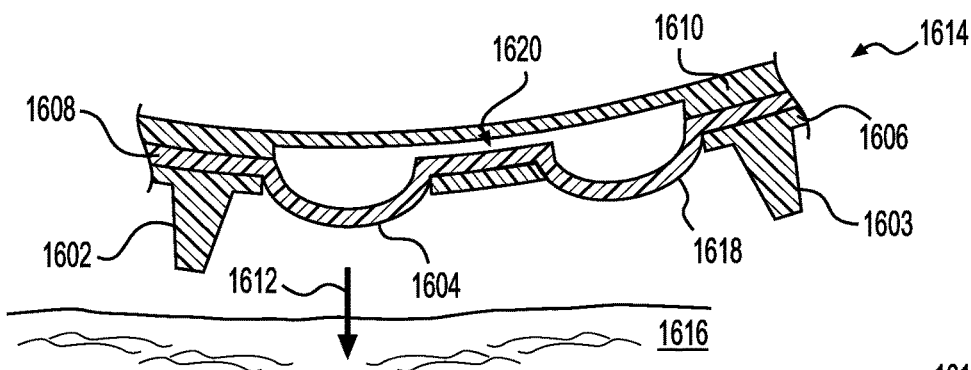
FIG. 18 is a schematic sectional view illustrating the sole structure in a pre-surface strike state of the stride cycle.

FIG. 18 is a schematic sectional view illustrating the sole structure 1614 of an article of footwear in a pre-surface strike state in an operation cycle of the structure. In this state, the article of footwear may be descending toward the ground surface 1616, as indicated by arrow 1612. As shown in FIG. 17, in this state, the fluid-filled chamber 1604 and second fluid filled chamber 1618 of the inner sole assembly is fully non-compressed and extended in a dome shape.

Figure 19:
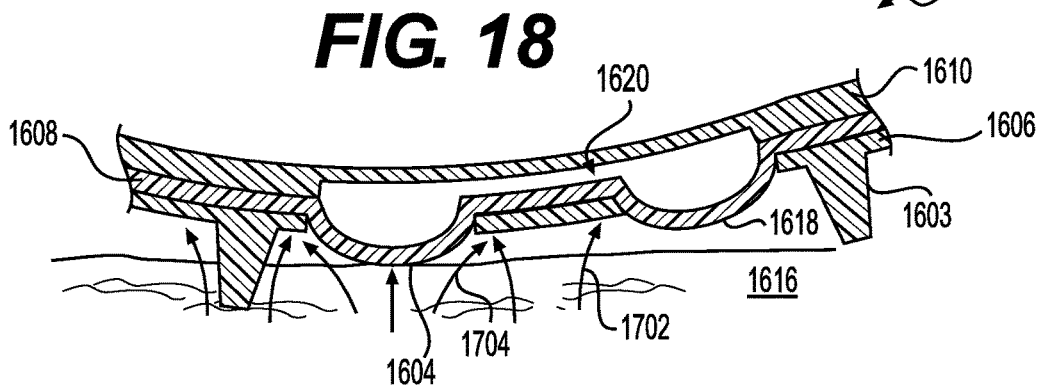
FIG. 19 is a schematic sectional view illustrating the sole structure in an initial surface strike state of the stride cycle.

FIG. 19 is a schematic sectional view illustrating the sole structure in an initial surface strike state in an operation cycle of the structure. In the initial surface strike state of FIG. 19, first stud 1602 and second stud 1603 may contact the ground surface 1616 in advance of the inner sole assembly, which is disposed above the ground surface 1616 and is fully extended in a dome shape. In this state, first stud 1602 and second stud 1603 may begin to displace ground surface material, as indicated by small solid arrows 1702. In this manner, a portion of ground surface material may be displaced into a space 1704 located under the first fluid-filled chamber 1604. The ground surface material, including displaced ground surface material, may begin to compact under the fluid-filled chamber.

Figure 20:
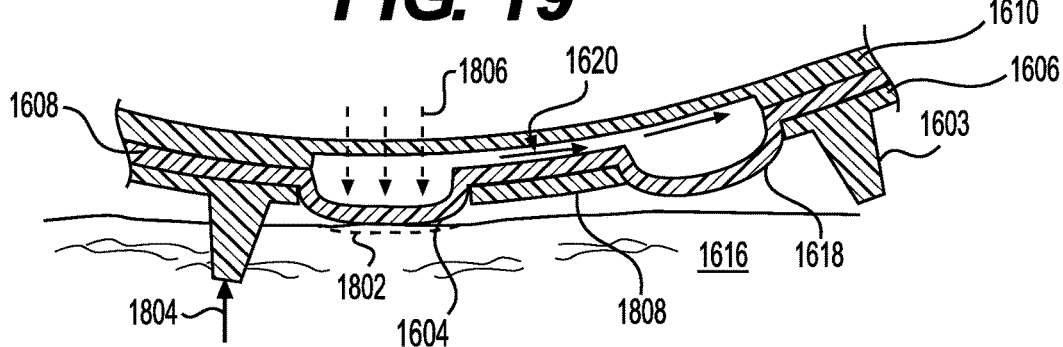
FIG. 20 is a schematic sectional view illustrating the sole structure in a partial ground penetration state of the stride cycle.

FIG. 20 is a schematic sectional view illustrating the sole structure in a partial ground penetration state in an operation cycle of the structures. In the partial ground penetration state of FIG. 20, the lower surface 1808 of the sole structure 1614 of the article of footwear begins to engage the ground surface 1616 with a compression force, as indicated by thick solid arrows 1804. A source of the compression force may include various factors, such as a force of weight of the athlete, a heel strike force, a thrust force (e.g., from an athlete changing a direction of stride or from a toe off push), and the like. Ground surface material located below the first fluid-filled chamber 1604, including ground surface material displaced by a penetrating first stud 1602 and second stud 1603, may be compacted under the fluid-filled chamber 1604 by the compression force 1804. The compression force 1804 may begin to create a layer of compacted surface material (indicated by dashed line) 1802 disposed on the exposed surface of the fluid-filled chamber 1604.

In the partial ground penetration state illustrated in FIG. 20 the exposed surface of the fluid-filled chamber 1604 of the inner sole assembly begins to deform by compression. Then, a portion of energy generated by the compression force 1804 is absorbed by the first fluid-filled chamber 1604 of the inner sole assembly. This absorbed energy may be expressed as a reactive force 1806 generated in the first fluid-filled chamber 1604 that is biased to return the exposed surface of the fluid-filled chamber 1604 to a fully extended dome shape. The reactive force 1806 generated by compression of the first fluid-filled chamber 1604 is small relative to the compression force 1804 between the sole structure 1614 and the ground surface 1616. The reactive force 1806 generated by the energy absorbed by the fluid-filled chamber 1604 need only be sufficient to return the exposed surface of the fluid-filled chamber 1604 to the fully extended dome shape upon release of the compression force 1804, as discussed below. Energy of the athlete corresponding to the compression force 1804 is substantially transferred to the ground surface, with a portion of the energy being transferred to fluid-filled chamber 1604 of the inner sole assembly.

In the partial ground penetration state illustrated in FIG. 20, the second fluid-filled chamber 1618 may be in fluid communication with first fluid-filled chamber 1604 through reservoir 1620. As pressure increases on the first fluid-filled chamber 1604, fluid is transferred towards second fluid-filled chamber 1618.

Figure 21:
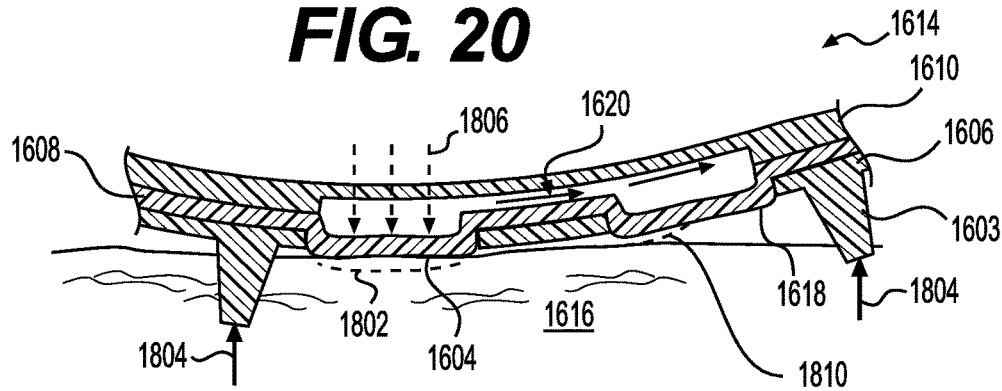
FIG. 21 is a schematic sectional view illustrating the sole structure in a full ground penetration/compression state of the stride cycle.

FIG. 21 is a schematic sectional view illustrating the sole structure in a full ground penetration/compression state in the operation cycle of the structure. The compression force 1804 at the sole structure 1614 may be at a maximum, with maximum transmission of the energy from the athlete to the ground surface. The compression force 1804 may be exerted across an entire surface area of the sole structure 1614. As shown in FIG. 21, the compression force 1804 may be substantially greater than the reaction force 1806 absorbed and stored in fluid-filled chamber 1604 of inner sole structure. As shown in FIG. 21, in the full ground penetration state, the layer of compacted ground surface material (indicated by dashed line) 1802 may be formed on the exposed surface of the fluid-filled chamber 1604 of the inner sole structure.

In a full ground/compression state in the operation of the cycle, first fluid-filled chamber 1604 may be in fluid communication with second fluid-filled chamber 1618 through reservoir 1620. As pressure increases on the first fluid-filled chamber 1604, fluid is transferred towards second fluid-filled chamber 1618. Second fluid-filled chamber 1618 also accumulates compacted ground surface material (indicated by dashed line) 1810 with the increased compression force 1804.

Figure 22:
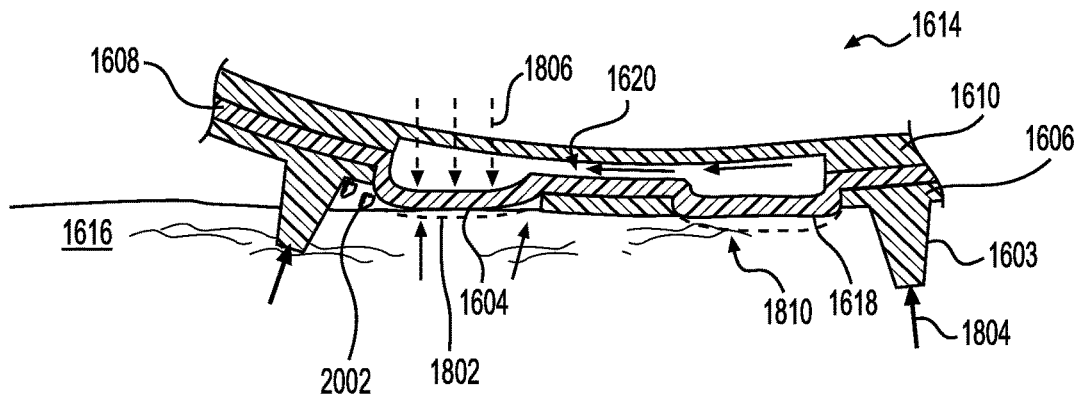
FIG. 22 is a schematic sectional view illustrating the sole structure in a partial release state of the stride cycle.

FIG. 22 is a schematic sectional view illustrating the sole structure in an initial release state in an operation cycle of the structure. As shown in FIG. 22, in the initial release state the sole structure 1614 of the article of footwear may begin to lift off from the ground surface. As the sole structure 1614 begins lift off from the ground surface 1616, the layer of compacted ground surface material 1802 may begin to separate from the ground surface and become exposed, and a compression force 1804 may begin to release. As the layer of compacted ground surface material 1802 becomes exposed and the compression force 1804 is released, a portion of the reactive energy absorbed and stored in the fluid-filled chamber 1604, expressed as reactive force 1806, may begin to expand a portion of the exposed surface of the fluid-filled chamber 1604 to begin to return the portion of the exposed surface of the fluid-filled chamber 1604 to a non-compressed state. In some embodiments the surface of the fluid-filled chamber 1604 may begin to move relative to the layer of compacted ground surface material 1802 and generate surface tension forces (including shear forces) between the exposed surface of the fluid-filled chamber 1604 and the layer of compacted surface material. In some embodiments the exposed surface of the fluid-filled chamber 1604 may twist or shift to a new orientation relative to the layer of compacted ground surface material 1802. Expansion of the portion of the exposed surface of the fluid-filled chamber 1604 may cause the layer of compacted ground surface material 1802 to begin to break apart into particles of ground surface material 2002.

In an initial release state in the operation of the cycle, second fluid-filled chamber 1618 may be in fluid communication with first fluid-filled chamber 1604 through reservoir 1620. As pressure increases on the second fluid-filled chamber 1618, fluid is transferred towards first fluid-filled chamber 1604 expanding the first fluid-filled chamber 1604 and compressing second fluid-filled chamber 1618. Second fluid-filled chamber 1618 also accumulates compacted ground surface material (indicated by dashed line) 1810 with the increased compression force 1804.

Figure 23:
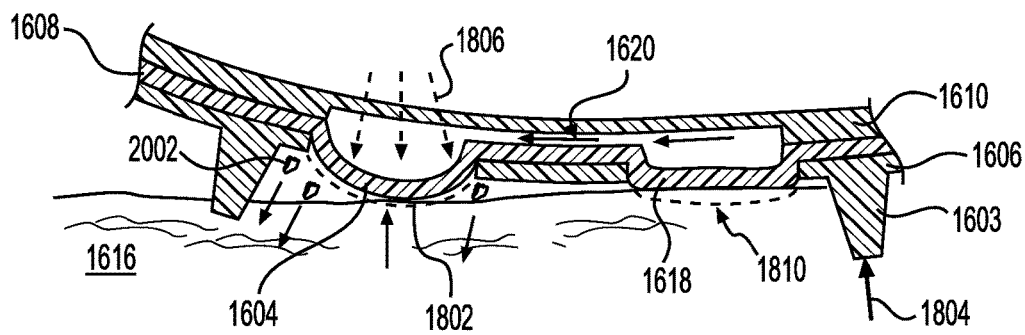
FIG. 23 is a schematic sectional view illustrating the sole structure in a substantial release state of the stride cycle.

FIG. 23 is a schematic sectional view illustrating the sole structure in a substantial release state in an operation cycle of the structure. In the substantial release state the sole structure 1614 continues to lift off from the ground surface 1616. In this state a compression force 1804 may continue to be applied between the ground surface 1616 and sole structure 1614. In this state, reactive energy absorbed and stored in the fluid-filled chamber 1604 may continue to be expressed as a reactive force 1806 at the exposed surface of the fluid-filled chamber 1604 to expand the exposed surface of the fluid-filled chamber 1604 toward a fully non-compressed state. Continued expansion of the exposed surface of the fluid-filled chamber 1604 may continue to break apart the layer of compacted ground surface material 1802 into particles of ground surface material 2002. In some embodiments, in response to release of the compression force 1804, the fluid-filled chamber 1604 may expand to a substantially expanded, non-compressed state. Reactive energy absorbed and stored in the fluid-filled chamber 1604 may be transferred to the particles of ground surface material 2002 to expel particles of ground surface material 2002 from the exposed surface of the fluid-filled chamber 1604.

In a substantial release state in the operation of the cycle, second fluid-filled chamber 1618 may be in fluid communication with first fluid-filled chamber 1604 through reservoir 1620. As pressure increases on the second fluid-filled chamber 1618, fluid is transferred towards first fluid-filled chamber 1604 expanding the first fluid-filled chamber 1604 and compressing second fluid-filled chamber 1618. Second fluid-filled chamber 1618 continues to accumulate compacted ground surface material (indicated by dashed line) 1810 with the increased compression force 1804.

Figure 24:
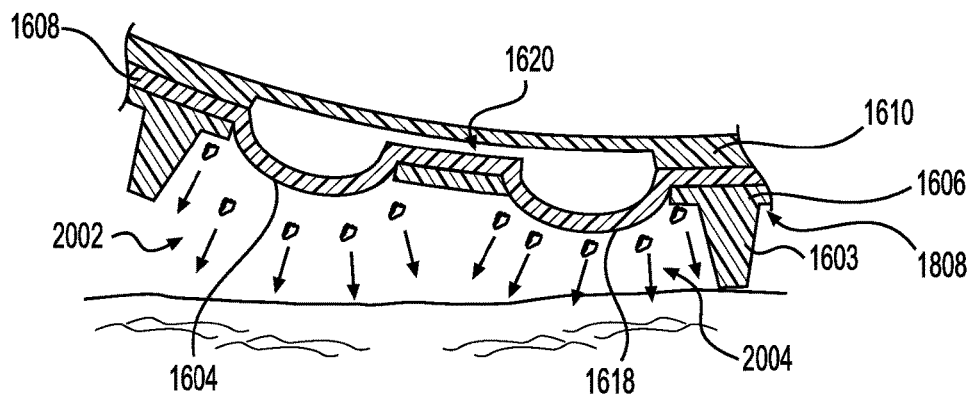
FIG. 24 is a schematic sectional view illustrating the sole structure in a full release state of the stride cycle.

FIG. 24 is a schematic sectional view illustrating the sole structure in a full release state in an operation cycle of the structure. In the full release state, the exposed surface of the first fluid-filled chamber 1604 and second fluid-filled chamber 1618 is fully extended in a dome shape, and the reactive energy absorbed and stored in the first fluid-filled chamber 1604 and second fluid-filled chamber 1618 from the compression force 1804 may be fully transferred from the first fluid-filled chamber 1604 and second fluid-filled chamber 1618 to first particles of ground surface material 2002 and second particles of ground surface material 2004. Ground surface material may be prevented from accumulating on the outer sole structure surface 1808 of the sole structure 1614 of the article of footwear in active use.

As discussed above, an exemplary embodiment of an inner sole structure may operate to prevent onset of accumulation of ground surface material on an outer sole structure surface of a sole structure of an article of footwear in active use of the article of footwear. As illustrated in FIGS. 1-24, in some embodiments an inner sole structure may operate in association with a heel strike to toe off stride cycle in active use of the article of footwear. In some embodiments, an inner sole structure may operate in association with other active use of an article of footwear. Non-exhaustive examples include playing sports such as soccer, football, lacrosse, etc., as well as activities in snow, ice, and slush. Those skilled in the art readily will appreciate alternative active use of an article of footwear suitable for a ground surface material accumulation prevention structure of the present disclosure.

Functional, operational, and performance characteristics of an inner sole assembly may be controlled by selecting materials and dimensional characteristics of the fluid-filled chamber of the assembly. A reactive force characteristic of the fluid-filled chamber may be determined by controlling various factors, including a material composition of the fluid-filled chamber, a desired rigidity of the fluid-filled chamber, a strength of the cured/hardened molding material(s), a thickness of the exposed surface of a dome-shaped fluid-filled chamber, a depth of the dome shaped fluid-filled chamber, a size of the fluid-filled chamber (e.g., radius or length and width), and an amount of molding material desired for making the fluid-filled chamber (cost factors). Other factors in light of the present disclosure and a desired application and performance characteristics may be selected for the intended use.

FIGS. 1-24 may have one or more advantages in a particular application. In some applications, one embodiment may have a more desired performance characteristic, such as providing a desired reactive force characteristic, providing a desired traction characteristic for a selected playing surface, or providing a desired safety characteristic. In some embodiments, one embodiment may have a more desired aesthetic characteristic than another embodiment. An appropriate configuration for a desired application may be selected for the intended use.

While various embodiments have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A sole structure comprising:
   a plate including an upper surface, a lower surface, a first aperture extending from the upper surface to the lower surface, a second aperture extending from the upper surface to the lower surface, and a plurality of ground-engaging members extending from the lower surface away from the plate and including a first series of ground-engaging members disposed along a periphery of the plate at a lateral side and a second series of ground-engaging members disposed along the periphery of the plate at a medial side; and
   a reservoir having a first surface and a second surface sealed along a periphery of the reservoir, the first surface being located distal to the upper surface and the second surface being located proximal the upper surface and defining a first fluid-filled chamber extending through the first aperture and from the lower surface and a second fluid-filled chamber extending through the second aperture and from the lower surface, the first fluid-filled chamber and the second fluid-filled chamber being in fluid communication with the reservoir, disposed between the first series of ground-engaging members and the second series of ground-engaging members, and extending from the lower surface to a lesser extent than at least one of the plurality of ground-engaging members.

2. The sole structure of claim 1, wherein an exterior surface of the first fluid-filled chamber and an exterior surface of the second fluid-filled chamber are formed of a polymer material.

3. The sole structure of claim 2, wherein the polymer material comprises a barrier material having a gas transmission rate for nitrogen gas of less than about 5 $cm^3/m^2 \cdot atm \cdot day$.

4. The sole structure of claim 1, wherein the plate has a first flexibility and the second surface has a second flexibility.

5. The sole structure of claim 4, wherein the first flexibility is less than the second flexibility.

6. The sole structure of claim 1, wherein the sole structure is secured to an upper.

7. A sole structure comprising:
   a plate including a first surface, a second surface disposed on an opposite side of the plate than the first surface, a first aperture extending through the plate and between the first surface and the second surface, a first plurality of studs extending from the second surface along a lateral side of the plate, and a second plurality of studs extending from the second surface along a medial side of the plate;
   a first layer in contact with the first surface of the plate; and
   a second layer attached to the first layer to define a first fluid-filled chamber disposed between the first plurality of studs and the second plurality of studs, the first fluid-filled chamber extending through the first aperture to form a first portion of a ground-contacting surface of the sole structure and extending from the second surface to a lesser extent than at least one of the first plurality of studs and the second plurality of studs.

8. The sole structure of claim 7, wherein the second surface of the plate forms a second portion of the ground-contacting surface of the sole structure.

9. The sole structure of claim 7, further comprising a second fluid-filled chamber defined by the first layer and the second layer and disposed between the first plurality of studs and the second plurality of studs.

10. The sole structure of claim 9, wherein the first fluid-filled chamber and the second fluid-filled chamber are in fluid communication with one another.

11. The sole structure of claim 10, further comprising a reservoir extending between and fluidly coupling the first fluid-filled chamber and the second fluid-filled chamber.

12. The sole structure of claim 11, wherein the reservoir is in contact with and opposes the first surface of the plate.

13. The sole structure of claim 9, wherein the plate includes a second aperture extending therethrough between the first surface and the second surface, the second aperture receiving the second fluid-filled chamber.

14. The sole structure of claim 13, wherein the second fluid-filled chamber forms a second portion of the ground-contacting surface of the sole structure.

15. The sole structure of claim 7, further comprising a second fluid-filled chamber defined by the second layer, disposed between the first plurality of studs and the second plurality of studs, extending through a second aperture of the plate, and extending from the second surface, the first fluid-filled chamber being disposed in a forefoot region of the plate and the second fluid-filled chamber being disposed in a heel region of the plate.

16. The sole structure of claim 15, wherein each of the first plurality of studs and the second plurality of studs extends from the second surface to a greater extent than the first fluid-filled chamber and the second fluid-filled chamber.

17. The sole structure of claim 7, wherein the plate is formed of an incompressible material and the second layer is formed of a compressible material.

18. The sole structure of claim 1, further comprising a third fluid-filled chamber defined by the second surface, disposed between the first series of ground-engaging members and the second series of ground-engaging members, extending through a third aperture of the plate, and extending from the lower surface, the first fluid-filled chamber and the second fluid-filled chamber being disposed in a forefoot region of the plate and the third fluid-filled chamber being disposed in a heel region of the plate.

19. The sole structure of claim 1, wherein each of the plurality of ground-engaging members extends from the lower surface to a greater extent than the first fluid-filled chamber and the second fluid-filled chamber.

20. The sole structure of claim 1, wherein the plate is formed of an incompressible material and the second surface is formed of a compressible material.

\* \* \* \* \*